(12) United States Patent
Tomatsu

(10) Patent No.: US 10,995,834 B2
(45) Date of Patent: May 4, 2021

(54) GEAR TRANSMISSION DEVICE AND IMAGE FORMING APPARATUS

(71) Applicant: BROTHER KOGYO KABUSHIKI KAISHA, Nagoya (JP)

(72) Inventor: Yoshiya Tomatsu, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 12 days.

(21) Appl. No.: 16/677,354

(22) Filed: Nov. 7, 2019

(65) Prior Publication Data
US 2020/0149618 A1 May 14, 2020

(30) Foreign Application Priority Data
Nov. 9, 2018 (JP) .............................. JP2018-211015

(51) Int. Cl.
| | | |
|---|---|---|
| F16H 1/16 | (2006.01) | |
| F16H 37/04 | (2006.01) | |
| G03G 21/16 | (2006.01) | |
| F16H 3/66 | (2006.01) | |

(52) U.S. Cl.
CPC .............. F16H 37/042 (2013.01); F16H 1/16 (2013.01); F16H 3/663 (2013.01); G03G 21/1647 (2013.01); F16H 2200/201 (2013.01); F16H 2200/2097 (2013.01)

(58) Field of Classification Search
CPC .......... F16H 37/042; F16H 1/16; F16H 3/663; F16H 2200/2097; F16H 2200/201; F16H 3/003; F16H 3/34; G03G 21/1647; G03G 2221/1657
See application file for complete search history.

(56) References Cited

U.S. PATENT DOCUMENTS

| | | | | |
|---|---|---|---|---|
| 8,919,023 | B2 * | 12/2014 | Merritt .................... | F41C 27/00 42/70.01 |
| 2005/0212959 | A1 * | 9/2005 | Manabe ................. | G02B 7/102 348/375 |
| 2014/0020489 | A1 | 1/2014 | Nozaki et al. | |
| 2017/0267473 | A1 * | 9/2017 | Watanabe .......... | G03G 15/6529 |
| 2020/0103006 | A1 * | 4/2020 | Tomatsu ............ | G03G 21/1647 |

FOREIGN PATENT DOCUMENTS

| | | |
|---|---|---|
| JP | 2010-053948 A | 3/2010 |
| JP | 2014-021378 A | 2/2014 |

* cited by examiner

Primary Examiner — David J Hlavka
(74) Attorney, Agent, or Firm — Baker Botts L.L.P.

(57) ABSTRACT

A gear transmission device includes a frame, a sun gear including a first shaft having a first axis, a driven gear, a planet gear movable between an engaged position and a disengaged position and including a second shaft having a second axis, an auxiliary gear including a third shaft, a first guide portion to guide the second shaft, and a second guide portion to guide the third shaft. At least a portion of the third shaft is positioned opposite to the driven gear relative to a first imaginary line passing the first axis and the second axis of the planet gear located at the disengaged position. As the sun gear rotates with the auxiliary gear in mesh with the planet gear, the third shaft moves with contacting a guide surface and the second shaft moves in a direction opposite to a direction in which the third shaft moves.

14 Claims, 22 Drawing Sheets

GEAR TRANSMISSION DEVICE AND IMAGE FORMING APPARATUS

CROSS-REFERENCE TO RELATED APPLICATION

This application claims priority from Japanese Patent Application No. 2018-211015 filed on Nov. 9, 2018, the content of which is incorporated herein by reference in its entirety.

TECHNICAL FIELD

Aspects of the disclosure relate to a gear transmission device and an image forming apparatus.

BACKGROUND

Examples of known gear transmission devices include pendulum gear mechanisms. In some pendulum gear mechanism, for example, a pendulum gear is configured to move around a circumference of a drive gear with meshing with the drive gear. The drive gear is rotatably supported by an attachment plate. The pendulum gear is also supported by the attachment plate so as to be rotatable about an axis extending parallel to an axis of the drive gear. A coil spring is disposed between the attachment plate and the pendulum gear. The coil spring exerts, on the pendulum gear, an urging force acting in a direction parallel to the direction in which the axis of the pendulum gear extends, thereby pressing the pendulum gear against the attachment plate at all times. A friction force caused between contacting surfaces of the attachment plate and the pendulum gear by such a coil spring enables the pendulum gear to move around the circumference of the drive gear in a direction in which the drive gear rotates.

SUMMARY

Nevertheless, in the known gear transmission devices such as the pendulum gear mechanism, a friction force to the pendulum gear is generated at all times by the coil spring. Thus, a driving load may always act in the pendulum gear mechanism.

Accordingly, aspects of the disclosure provide a gear transmission device in which a driving load may act may be reduced, and an image forming apparatus including such a gear transmission device.

According to one or more aspects of the disclosure, a gear transmission device includes a frame, a sun gear, a driven gear, a planet gear, an auxiliary gear, a first guide portion, and a second guide portion. The sun gear includes a first shaft having a first axis. The sun gear is supported by the frame and rotatable about the first axis. The driven gear is rotatably supported by the frame and spaced from the sun gear. The planet gear is disposed in mesh with the sun gear and includes a second shaft having a second axis. The planet gear is rotatable about the second axis and movable about the first axis of the sun gear between an engaged position at which the planet gear is in mesh with the driven gear and a disengaged position at which the planet gear is spaced farthest from the driven gear. The auxiliary gear is meshable with the planet gear. The auxiliary gear includes a third shaft having a third axis. The auxiliary gear is rotatable about the third axis. The first guide portion is included in the frame and configured to guide the second shaft. The second guide portion is included in the frame. The second guide portion has a guide surface. The second guide portion is configured to guide the third shaft. At least a portion of the third shaft of the auxiliary gear is positioned opposite to the driven gear relative to a first imaginary line as viewed in a first axis direction in which the first axis of the sun gear extends. The first imaginary line passes the first axis and the second axis of the planet gear located at the disengaged position. As the sun gear rotates with the auxiliary gear in mesh with the planet gear, the third shaft moves in the second guide portion with contacting the guide surface of the second guide portion and the second shaft moves in a direction opposite to a direction in which the third shaft moves.

Consequently, such a configuration may reduce a driving load that may act in the gear transmission device, thereby reducing noise and power consumption in the image forming apparatus including such a gear transmission device.

DETAILED DESCRIPTION

Hereinafter, first, second, and third illustrative embodiments will be described with reference to the accompanying drawings.

First Illustrative Embodiment

An image forming apparatus 9 according to the first illustrative embodiment is an example of an image forming apparatus. The image forming apparatus 9 includes a gear transmission device 1 (refer to FIGS. 2, 3, and 4) according to the first illustrative embodiment. The gear transmission device 1 according to the first illustrative embodiment is an example of a gear transmission device.

Overall Configuration of Image Forming Apparatus

Figure 1:
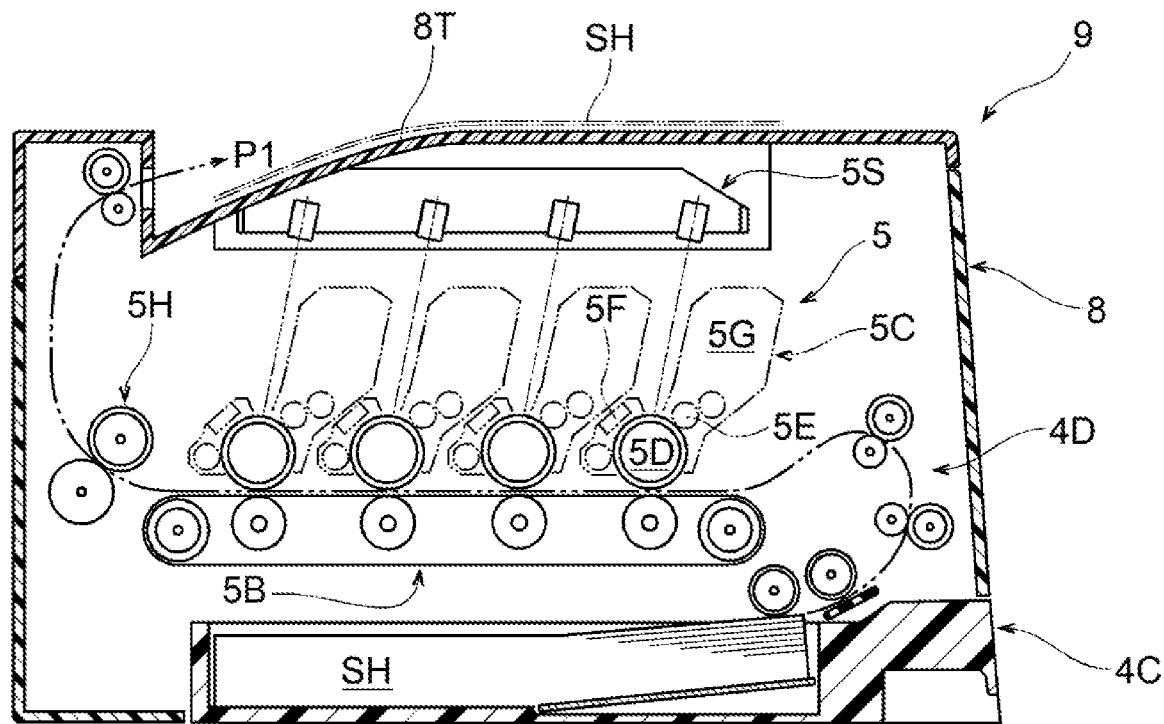
FIG. 1 is a schematic sectional view of an image forming apparatus including a gear transmission device according to a first illustrative embodiment of the disclosure.

As illustrated in FIG. 1, the image forming apparatus 9 includes a housing 8, a sheet cassette 4C, a conveyance mechanism 4D, and an image forming unit 5.

The sheet cassette 4C is disposed at the bottom of the housing 8. The sheet cassette 4C is configured to house one or more sheets SH stacked therein. The conveyance mechanism 4D is configured to feed a sheet SH one by one from the sheet cassette 4C, convey the sheet SH along a substantially S-shaped conveyance path P1, and output the sheet SH onto a discharge tray 8T. The discharge tray 8T is provided at the top of the housing 8.

The image forming unit 5 is disposed above the sheet cassette 4C in the housing 8. The image forming unit 5 defines a substantially horizontally extending part (hereinafter, referred to as the "horizontal part") of the conveyance path P1. A sheet SH being conveyed by the conveyance mechanism 4D passes the image forming unit 5 when the sheet SH moves in the horizontal part of the conveyance path P1.

The image forming unit 5 may be a direct-tandem type color image forming unit. The image forming unit 5 includes developer cartridges 5C, a transfer belt 5B, a scanner 5S, and a fixing device 5H.

The developer cartridges 5C include four cartridges corresponding to four toner colors of, for example, black, yellow, magenta, and cyan. The developer cartridges 5C are disposed in tandem along the horizontal part of the conveyance path P1. Each of the developer cartridges 5C includes a photosensitive drum 5D, a developing roller 5E, a charger 5F, and a toner storage 5G. The developing roller 5E, the charger 5F, and the toner storage 5G are disposed in the vicinity of the photosensitive drum 5D.

The transfer belt 5B is disposed below the photosensitive drums 5D to define the horizontal part of the conveyance path P1 therebetween. The transfer belt 5B may rotate with holding a sheet SH in cooperation with one or more of the photosensitive drums 5D.

The scanner 5S includes known laser sources, a polygon mirror, lenses, and reflectors. The scanner 5S is configured to irradiate circumferential surfaces of the photosensitive drums 5D in the respective developer cartridges 5C with laser beams corresponding to the colors of black, yellow, magenta, and cyan.

The fixing device 5H includes a heat roller and a pressure roller. The heat roller and the pressure roller hold therebetween a sheet SH that has passed under the developer cartridges 5C to apply heat and pressure to the sheet SH.

The image forming unit 5 is configured to form an image on a sheet SH as described below. The circumferential surface of each photosensitive drum 5D is uniformly and positively charged by a corresponding charger 5F and is then exposed by the scanner 5S. Thus, an electrostatic latent image corresponding to an image to be formed on the sheet SH is formed on the circumferential surface of each photosensitive drum 5D. Each developing roller 5E then supplies toner onto the circumferential surface of a corresponding one of the photosensitive drums 5D from a corresponding toner storage 5G. Thus, the electrostatic latent images are developed to toner images on the respective photosensitive drums 5D. The toner images held by the circumferential surfaces of the respective photosensitive drums 5D are transferred onto a sheet SH. The fixing device 5H then applies heat and pressure to the sheet SH on which the toner images have been transferred and the conveyance mechanism 4D discharges the sheet SH onto the discharge tray 8T.

Figure 3:
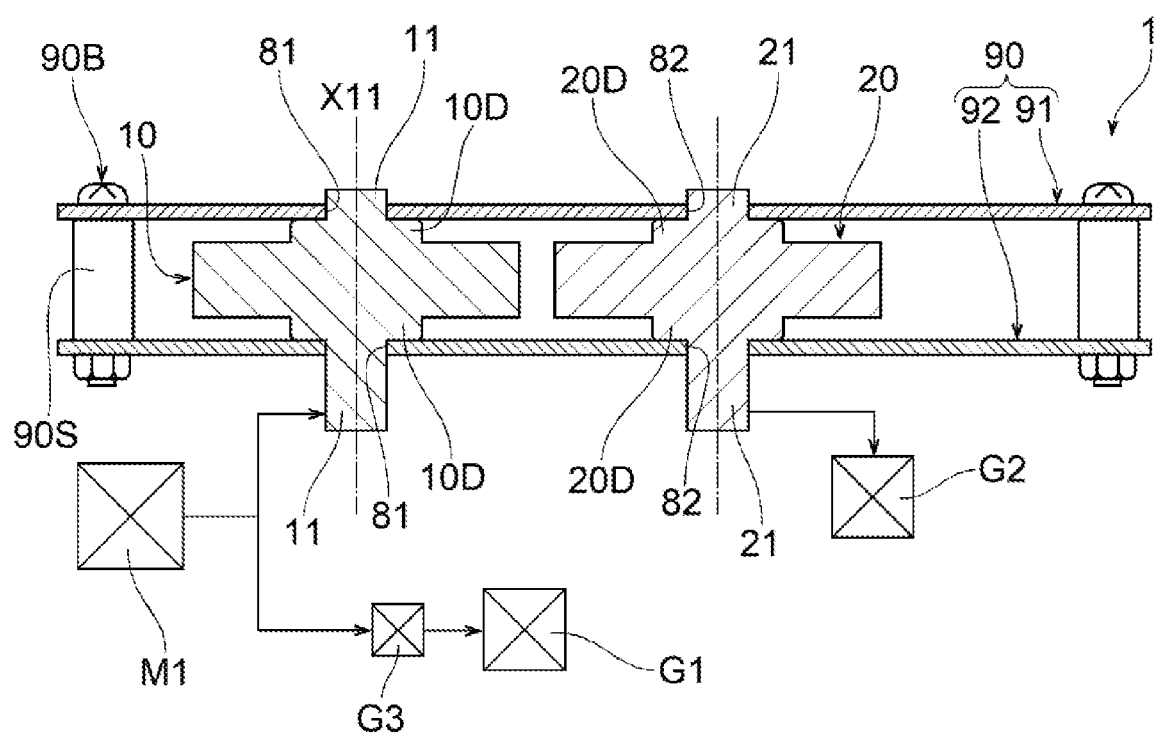
FIG. 3 is a sectional view of the gear transmission device taken along line A-A of FIG. 2 according to the first illustrative embodiment of the disclosure.

The image forming apparatus 9 is configured to perform color printing and monochrome printing. As illustrated in FIG. 3, the housing 8 houses a drive source M1, a first transmission unit G1, a second transmission unit G2, the gear transmission device 1, and a rotating direction control mechanism G3.

The drive source M1 is configured to rotate selectively in one of a forward direction and a reverse direction to generate a drive force for driving, for example, the image forming unit 5. The first transmission unit G1 includes gears and transmission shafts. The first transmission unit G1 is connected to the developing roller 5E for black. The second transmission unit G2 includes gears and transmission shafts. The second transmission unit G2 is connected to each of the developing rollers 5E for yellow, magenta, and cyan, respectively. The gear transmission device 1 is located between the drive source M1 and the second transmission unit G2 in a first drive force transmission route.

The rotating direction control mechanism G3 is located between the drive source M1 and the first transmission unit G1 in a second drive force transmission route. The rotating direction control mechanism G3 is configured to transmit a drive force in a particular rotating direction to the first transmission unit G1 from the drive source M1 regardless of the rotating direction (e.g., the forward direction or the reverse direction) of the drive source M1.

In one example, the rotating direction control mechanism G3 may include a pendulum gear mechanism, a first output gear assembly, and a second output gear assembly. The pendulum gear mechanism is connected to the drive source M1. The first and second gear assemblies are connected in parallel to the first transmission unit G1. In such a case, in response to the drive source M1 rotating in the forward direction, the pendulum gear mechanism comes into mesh with the first output gear assembly and comes separate from the second output gear assembly. Thus, the first output gear assembly transmits a drive force in the particular rotating direction to the first transmission unit G1 from the drive source M1. In response to the drive source M1 rotating in the reverse direction, the pendulum gear mechanism comes separate from the first output gear assembly and comes into mesh with the second output gear assembly. Thus, the second output gear assembly transmits a drive force in the particular rotating direction to the first transmission unit G1 from the drive source M1.

In another example, the image forming apparatus 9 may include a gear transmission device 3 according to the third illustrative embodiment as an alternative to the rotating direction control mechanism G3.

For color printing, the drive source M1 is rotated in the forward direction. In response to the rotation of the drive source M1, in the image forming apparatus 9, a drive force is transmitted to the first transmission unit G1 via the rotating direction control mechanism G3 from the drive source M1 and also transmitted to the second transmission unit G2 via the gear transmission device 1 from the drive source M1. That is, the gear transmission device 1 allows transmission of the drive force to the second transmission unit G2 from the drive source M1. Thus, all of the developing rollers 5E are rotated.

For monochrome printing, the drive source M1 is rotated in the reverse direction. In response to the rotation of the drive source M1, in the image forming apparatus 9, a drive force is transmitted to the first transmission unit G1 via the rotating direction control mechanism G3 from the drive source M1. Nevertheless, the gear transmission device 1 interrupts transmission of the drive force to the second transmission unit G2 from the drive source M1. Thus, only the developing roller 5E for black is rotated.

Configuration of Gear Transmission Device

As illustrated in FIGS. 2 to 8, the gear transmission device 1 includes a frame 90, a sun gear 10, a driven gear 20, a planet gear 30, an auxiliary gear 40, first guide portions 50, and second guide portions 60.

Figure 2:
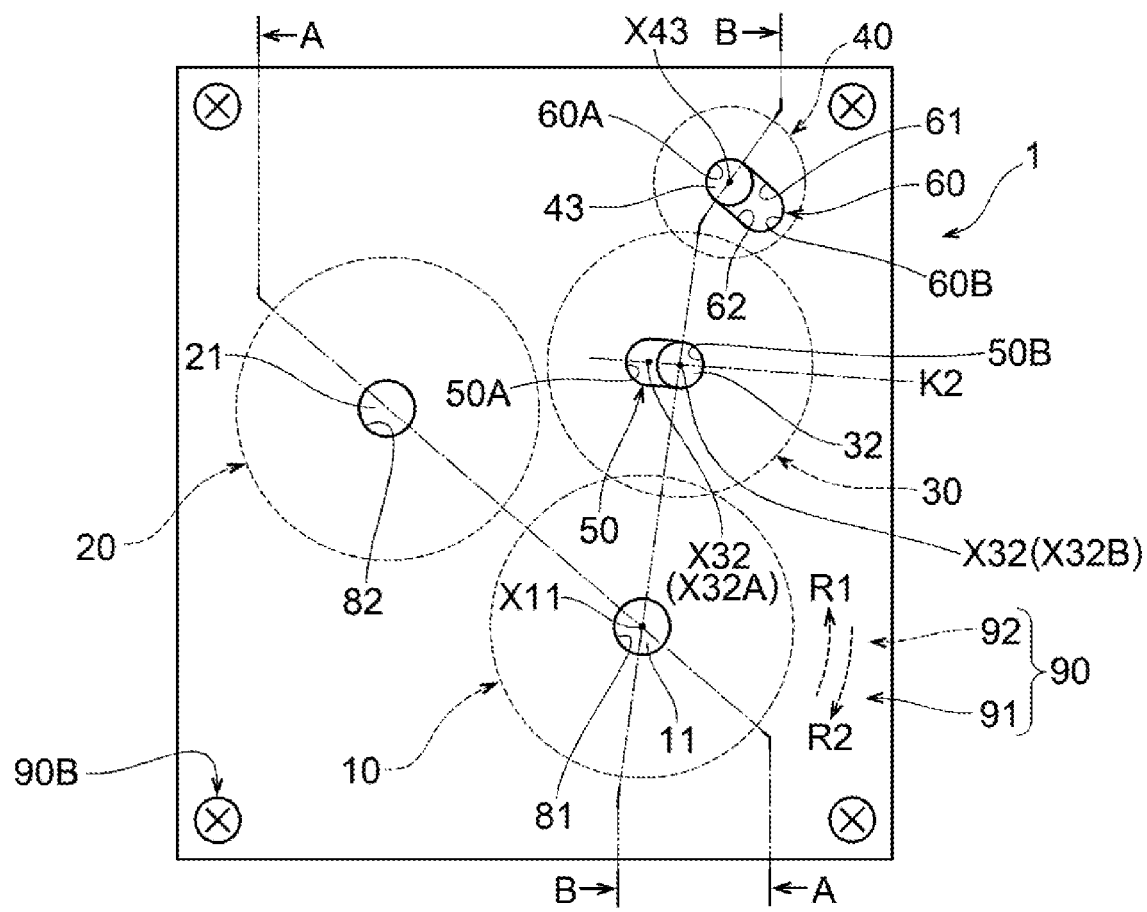
FIG. 2 is a plan view of a gear transmission device according to the first illustrative embodiment of the disclosure.

As illustrated in FIGS. 2 and 3, the frame 90 includes a first frame 91 and a second frame 92. The first frame 91 and the second frame 92 are substantially rectangular flat plates. In FIGS. 2 and 3, the first frame 91 and the second frame 92 are simply illustrated. Nevertheless, in actual, the first frame 91 and the second frame 92 may each have a size large enough to hold other mechanical parts or elements in addition to the gear transmission device 1 and a complicated shape or structure having a plurality of holes and bent portions.

The first frame 91 and the second frame 92 face each other and extend parallel to each other with spacers 90S disposed between their corners. The first frame 91 and the second frame 92 are fastened to each other using fastening members 90B such as screws and nuts.

Figure 5:
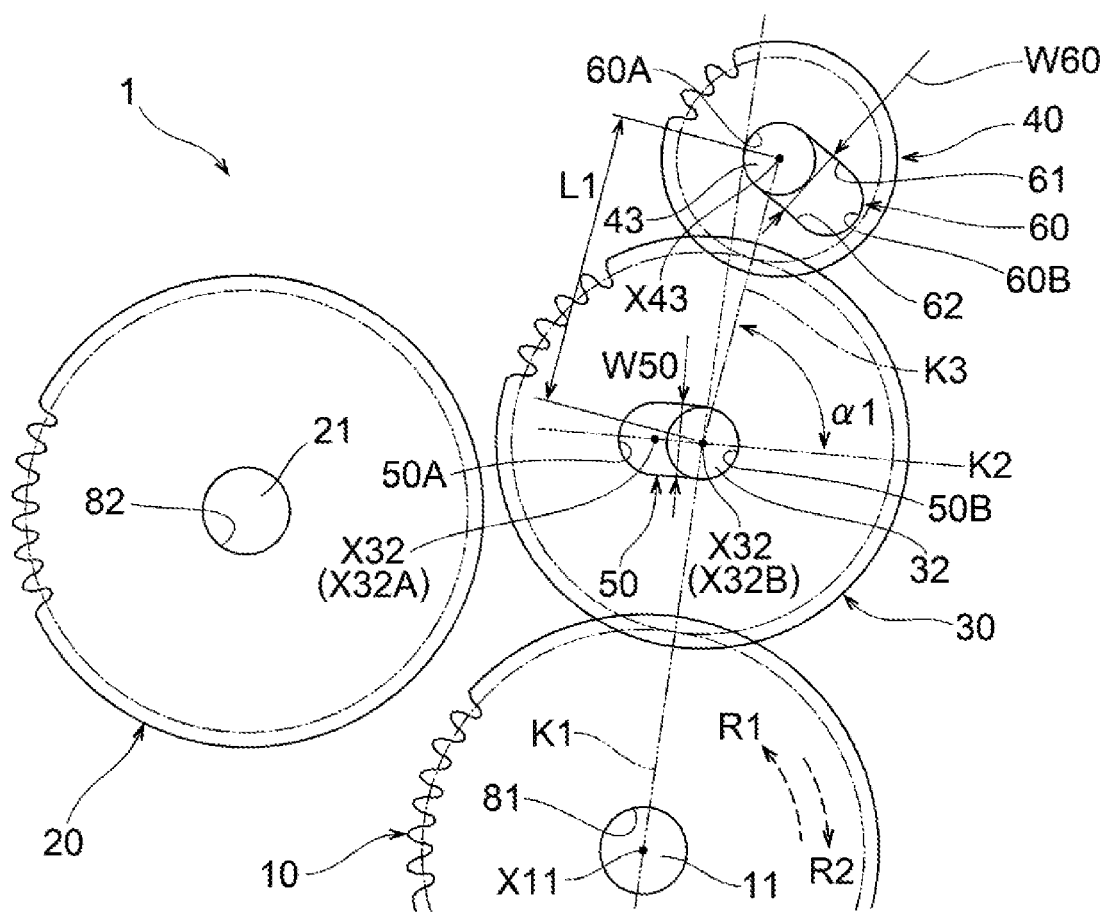
FIG. 5 is a schematic partial front view illustrating a relative positional relationship between a sun gear, a driven gear, a planet gear at a disengaged position, an auxiliary gear, a first guide portion, and a second guide portion according to the first illustrative embodiment of the disclosure.

As simply illustrated in FIG. 5, the sun gear 10 and the driven gear 20 may be spur gears.

As illustrated in FIG. 3, the sun gear 10 has a one-piece structure including a first shaft 11. The first shaft 11 may be a cylindrical shaft that extends in the same direction as a direction in which the first frame 91 and the second frame 92 face each other. The first shaft 11 has a first axis X11 as its center.

The first shaft 11 protrudes from each side of the sun gear 10 toward the first frame 91 or toward the second frame 92. The sun gear 10 is supported by the frame 90 so as to be rotatable about the first axis X11. More specifically, the first frame 91 and the second frame 92 have through holes 81, respectively, for receiving the first shaft 11. The first shaft 11 is engaged with the through holes 81 of the first frame 91 and the second frame 92 by insertion.

The sun gear 10 includes stepped portions 10D around the first shaft 11 and on the side facing the first frame 91 and the side facing the second frame 92, respectively. The sun gear 10 is disposed such that the stepped portions 10D face the first frame 91 and the second frame 92, respectively, with a slight gap left therebetween. Such an arrangement may thus reduce rattling of the sun gear 10 in a direction in which the first axis X11 extends (hereinafter, simply referred to as the "first axis direction").

A portion of the first shaft 11 engaged with the through hole 81 of the second frame 92 protrudes relative to the second frame 92 toward a direction opposite to the first frame 91 and is connected to the drive source M1. The sun gear 10 is configured to, in response to the first shaft 11 receiving a drive force from the drive source M1 rotating in the forward direction, rotate in a first direction R1 (refer to FIG. 5). The first direction R1 corresponds to a counter-clockwise direction in FIG. 5. The sun gear 10 is further configured to, in response to the first shaft 11 receiving a drive force from the drive source M1 rotating in the reverse direction, rotate in a second direction R2 (refer to FIG. 5). The second direction R2 is opposite to the first direction R1.

As illustrated in FIGS. 2 and 3, the driven gear 20 is spaced from the sun gear 10 by a particular distance. As illustrated in FIG. 3, the driven gear 20 has a one-piece structure including a rotating shaft 21. The rotating shaft 21 may be a cylindrical shaft that extends parallel to the first shaft 11.

The rotating shaft 21 protrudes from each side of the driven gear 20 toward the first frame 91 or toward the second frame 92. The driven gear 20 is supported by the frame 90 so as to be rotatable about an axis of the rotating shaft 21. More specifically, the first frame 91 and the second frame 92 have through holes 82, respectively, for receiving the rotating shaft 21. The rotating shaft 21 is engaged with the through holes 81 of the first frame 91 and the second frame 92 by insertion.

The driven gear 20 includes stepped portions 20D around the rotating shaft 21 and on the side facing the first frame 91 and the side facing the second frame 92, respectively. The driven gear 20 is disposed such that the stepped portions 20D face the first frame 91 and the second frame 92, respectively, with a slight gap left therebetween. Such an arrangement may thus reduce rattling of the driven gear 20 in the first axis direction.

A portion of the rotating shaft 21 engaged with the through hole 82 of the second frame 92 protrudes relative to the second frame 92 toward a direction opposite to the first frame 91 and is connected to the second transmission unit G2.

Figure 4:
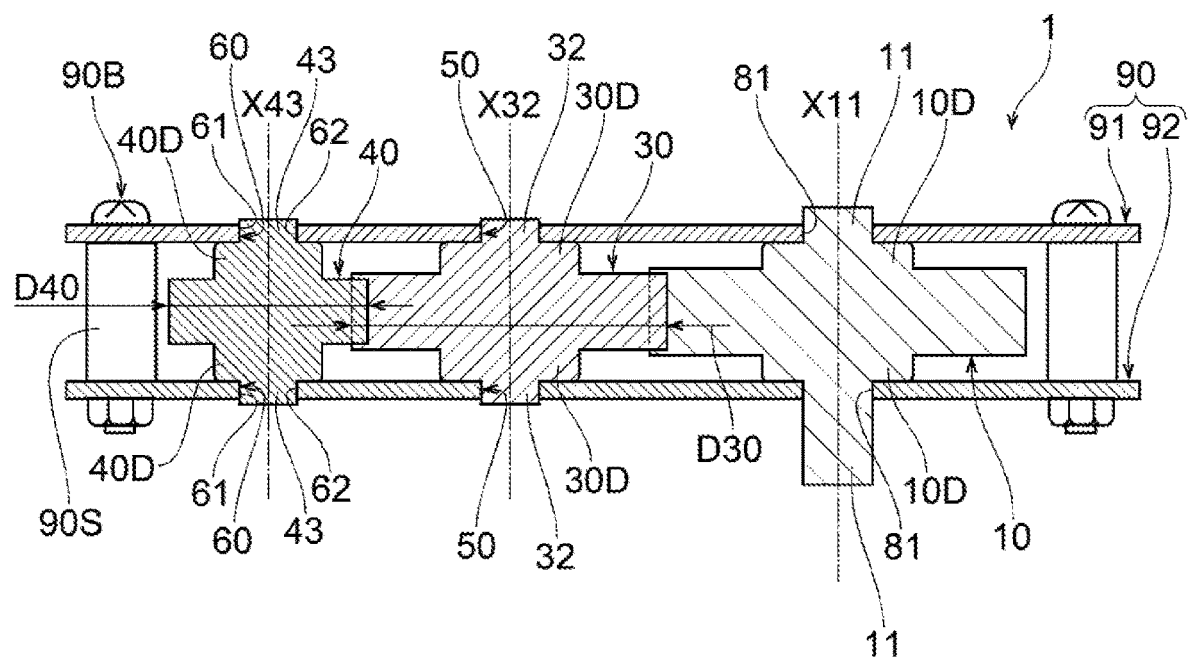
FIG. 4 is a sectional view of the gear transmission device taken along line B-B of FIG. 2 according to the first illustrative embodiment of the disclosure.

As simply illustrated in FIG. 5, the planet gear 30 and the auxiliary gear 40 may also be spur gears similar to the sun gear 10 and the driven gear 20. As illustrated in FIG. 4, the auxiliary gear 40 has an outside diameter D40, and the planet gear 30 has an outside diameter D30. The outside diameter D40 of the auxiliary gear 40 is less than the outside diameter D30 of the planet gear 30.

The planet gear 30 has a one-piece structure including a second shaft 32. The second shaft 32 may be a cylindrical shaft that extends parallel to the first shaft 11. The second shaft 32 has a second axis X32 as its center. The second shaft 32 protrudes from each side of the planet gear 30 toward the first frame 91 or toward the second frame 92.

The auxiliary gear 40 has a one-piece structure including a third shaft 43. The third shaft 43 may be a cylindrical shaft that extends parallel to the first shaft 11. The third shaft 43 has a third axis X43 as its center. The third shaft 43 protrudes from each side of the auxiliary gear 40 toward the first frame 91 or toward the second frame 92.

As illustrated in FIGS. 2, and 4 to 6, the first frame 91 and the second frame 92 include the first guide portions 50, respectively. The first guide portions 50 may be grooves that penetrate the first frame 91 and the second frame 92, respectively. The first guide portions 50 are engaged with the second shaft 32 of the planet gear 30 by insertion.

Both of the first guide portions 50 may have the same configuration and function, and hereinafter, the description is thus provided with respect to one of the first guide portions 50. As illustrated in FIG. 5, the first guide portion 50 has an arc shape and may be a segment of a circle having the first axis X11 as its center. The first guide portion 50 has an inner width W50 in a radial direction of the first shaft 11. The inner width W50 is slightly greater than an outside diameter of the second shaft 32.

The first guide portion 50 has a first end 50A and a second end 50B in a circumferential direction of the first shaft 11. The first end 50A is closer to the driven gear 20 than the second end 50B is to the driven gear 20. The first end 50A and the second end 50B each have a curved surface that forms a semicircular arc shape as viewed in the first axis direction.

As illustrated in FIGS. 5 to 8, the first guide portion 50 is configured to, when the second shaft 32 moves in the first guide portion 50, guide the second shaft 32 to move about the first axis X11 with the planet gear 30 in constant mesh with the sun gear 10. That is, the planet gear 30 is supported by the frame 90 such that the planet gear 30 is rotatable about the second axis X32 of the second shaft 32 and is movable about the first axis X11 of the sun gear 10.

As illustrated in FIG. 4, the planet gear 30 includes stepped portions 30D around the second shaft 32 and on the side facing the first frame 91 and the side facing the second frame 92, respectively. The planet gear 30 is disposed such that the stepped portions 30D face the first frame 91 and the second frame 92, respectively, with a slight gap left therebetween. Such an arrangement may thus reduce rattling of the planet gear 30 in the first axis direction.

As illustrated in FIG. 5, when the second shaft 32 of the planet gear 30 is located at a particular position where the second shaft 32 is in contact with the second end 50B of the first guide portion 50 and the second end 50B restricts a further movement of the second shaft 32 toward the second end 50B, the planet gear 30 is spaced farthest from the driven gear 20. This particular position (refer to FIGS. 2 and 5) of the planet gear 30 may be referred to as a disengaged position. When the planet gear 30 is located at the disengaged position, the further movement of the second shaft 32 toward the second end 50B is restricted.

Figure 6:
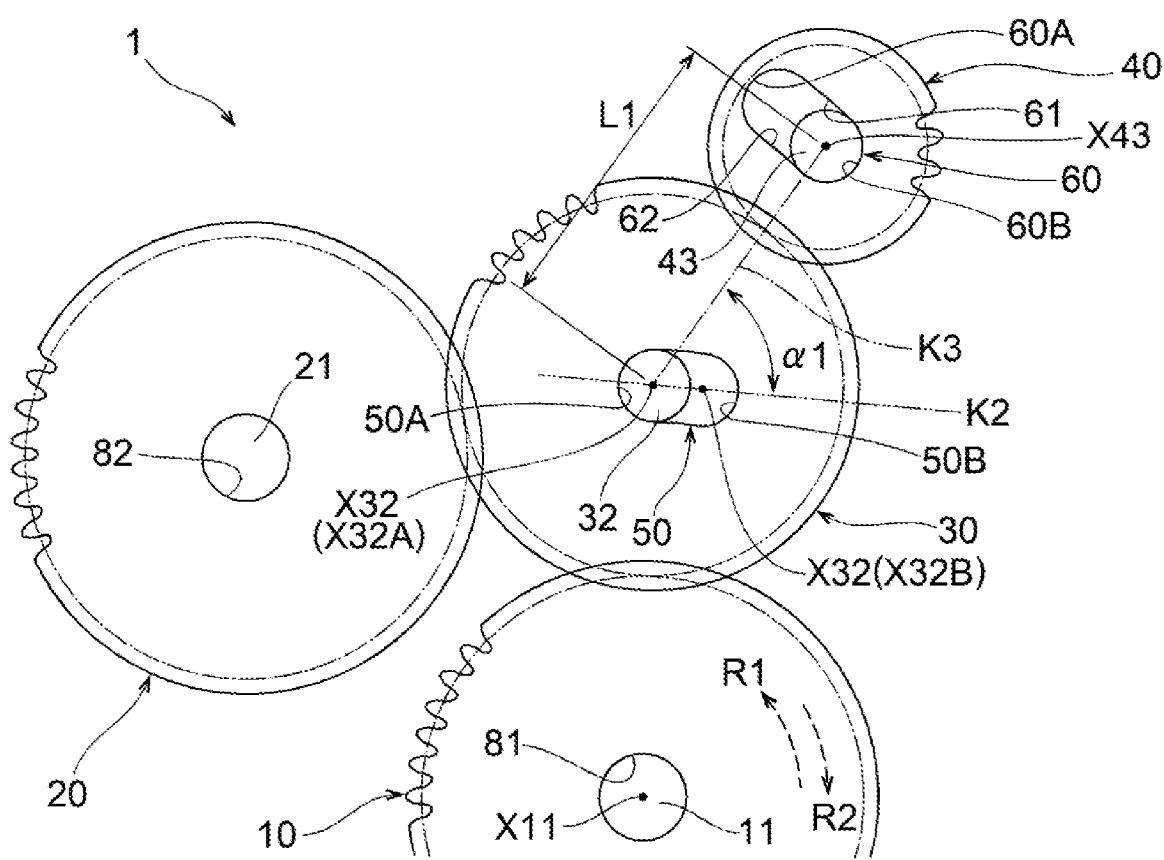
FIG. 6 is a schematic partial front view illustrating the relative positional relationship between the sun gear, the driven gear, the planet gear at an engaged position, the auxiliary gear, the first guide portion, and the second guide portion according to the first illustrative embodiment of the disclosure.

As illustrated in FIG. 6, when the second shaft 32 of the planet gear 30 is located at another particular position where the second shaft 32 is in contact with the first end 50A of the first guide portion 50 and the first end 50A restricts a further movement of the second shaft 32 toward the first end 50A, the planet gear 30 is in mesh with the driven gear 20 with interlocking teeth by a proper meshing depth. This particular position (refer to FIG. 6) of the planet gear 30 may be referred to as an engaged position.

Figure 7:
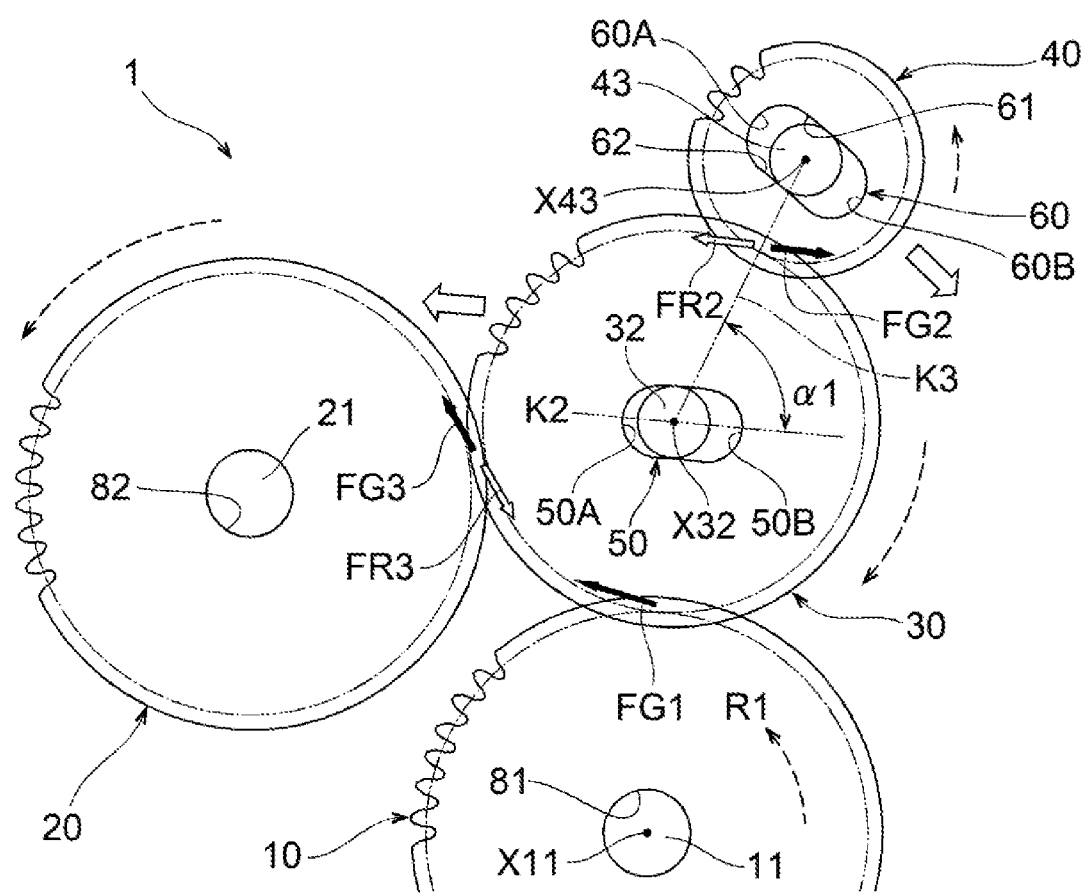
FIG. 7 is a schematic partial front view illustrating the relative positional relationship between the sun gear, the driven gear, the planet gear, the auxiliary gear, the first guide portion, and the second guide portion before establishment of the relationship of FIG. 6 and after establishment of the relationship of FIG. 5 according to the first illustrative embodiment of the disclosure.

As illustrated in FIG. 7, as the second shaft 32 moves from the second end 50B toward the first end 50A in the first guide portion 50, the planet gear 30 comes into mesh with the driven gear 20 and the meshing depth of the planet gear 30 and the driven gear 20 becomes deeper gradually.

Figure 8:
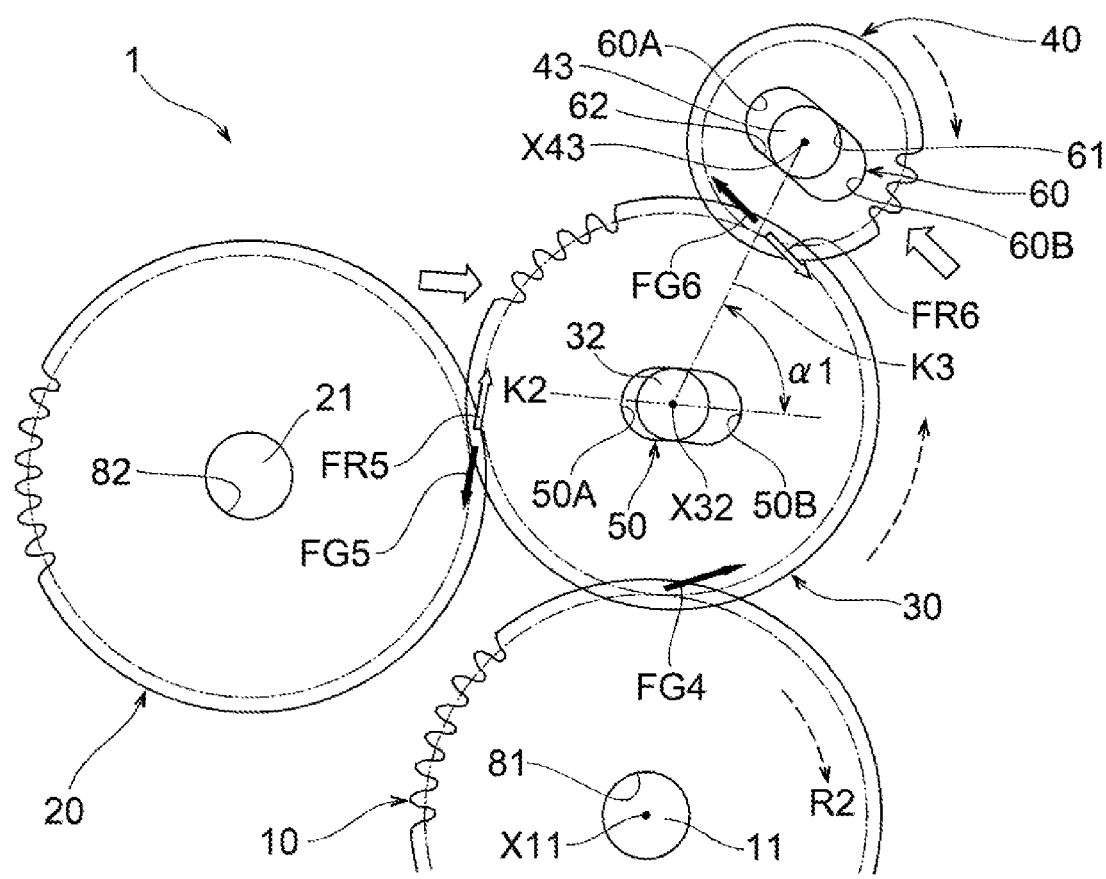
FIG. 8 is a schematic partial front view illustrating the relative positional relationship between the sun gear, the driven gear, the planet gear, the auxiliary gear, the first guide portion, and the second guide portion before establishment of the relationship of FIG. 5 and after establishment of the relationship of FIG. 6 according to the first illustrative embodiment of the disclosure.

As illustrated in FIG. 8, as the second shaft 32 moves from the first end 50A toward the second end 50B in the first guide portion 50, the meshing depth of the planet gear 30 and the driven gear 20 becomes shallower gradually and thus the planet gear 30 disengages from the driven gear 20.

As illustrated in FIG. 5, a first imaginary line K1 is defined as viewed in the first axis direction. The first imaginary line K1 passes the first axis X11 of the first shaft 11 and the second axis X32 (X32B) of the second shaft 32 of the planet gear 30 located at the disengaged position.

As illustrated in FIG. 5, a second imaginary line K2 is defined as viewed in the first axis direction. The second imaginary line K2 passes the second axis X32(X32A) of the second shaft 32 of the planet gear 30 located at the engaged position and the second axis X32 (X32B) of the second shaft 32 of the planet gear 30 located at the disengaged position. The second imaginary line K2 extends along a direction in which the planet gear 30 moves backward and forward (hereinafter, simply referred to as the "moving direction of the planet gear 30").

As illustrated in FIGS. 2, and 4 to 6, the first frame 91 and the second frame 92 include the second guide portions 60, respectively. Like the first guide portions 50, the second guide portions 60 may be grooves that penetrate the first frame 91 and the second frame 92, respectively. The second guide portions 60 are engaged with the third shaft 43 of the auxiliary gear 40 by insertion.

Both of the second guide portions 60 may have the same configuration and function, and hereinafter, the description is thus provided with respect to one of the second guide portions 60. As illustrated in FIG. 5, as viewed in the first axis direction, the second guide portion 60 is positioned opposite to the driven gear 20 relative to the first imaginary line K1 and opposite to the sun gear 10 relative to the second imaginary line K2.

The second guide portion 60 has a first end 60A and a second end 60B in its longitudinal direction. The first end 60A is positioned closer to the first imaginary line K1 than the second end 60B is to the first imaginary line K1, and farther from the second imaginary line K2 than the second end 60B is from the second imaginary line K2. The first end 60A and the second end 60B each have a curved surface that forms a semicircular arc shape as viewed in the first axis direction.

The second guide portion 60 has a first guide surface 61 and a second guide surface 62. The first guide surface 61 and the second guide surface 62 are an example of a guide surface of a second guide portion.

The first end 60A of the second guide portion 60 has one end and the other end. The one end of the first end 60A is farther from the planet gear 30 than the other end of the first end 60A is from the planet gear 30. The second end 60B of the second guide portion 60 has one end and the other end. The one end of the second end 60B is farther from the planet gear 30 than the other end of the second end 60B is from the planet gear 30. In the second guide portion 60, the first guide surface 61 extends from the one end of the first end 60A to the one end of the second end 60B. The first guide surface 61 is positioned farther from the planet gear 30 than the second guide surface 62 is from the planet gear 30 in a radial direction of the planet gear 30, and is contactable with the third shaft 43.

In the second guide portion 60, the second guide surface 62 extends from the other end of the first end 60A to the other end of the second end 60B. The second guide surface 62 is positioned closer to the planet gear 30 than the first guide surface 61 to the planet gear 30 in the radial direction of the planet gear 30, and is contactable with the third shaft 43.

The first guide surface 61 and the second guide surface 62 face each other and are spaced from each other by a gap W60. The gap W60 is slightly greater than the outside diameter of the third shaft 43. The first guide surface 61 and the second guide surface 62 extend from the first end 60A to the second end 60B of the second guide portion 60 with maintaining a constant separation.

As illustrated in FIGS. 5 to 8, the first guide surface 61 and the second guide surface 62 of the second guide portion 60 are configured to, when the third shaft 43 moves in the second guide portion 60 with the auxiliary gear 40 in constant mesh with the planet gear 30, guide the third shaft 43 such that the third shaft 43 moves between a first particular position and a second particular position. The first particular position may refer to a position where the third shaft 43 is in contact with the first end 60A of the second guide portion 60 and the first end 60A restricts a further movement of the third shaft 43 toward the first end 60A. The second particular position may refer to a position where the third shaft 43 is in contact with the second end 60B of the second guide portion 60 and the second end 60B restricts a further movement of the third shaft 43 toward the second end 60B. That is, the auxiliary gear 40 is supported by the frame 90 such that the auxiliary gear 40 rotates about the third axis X43 and moves along the second guide portion 60 in the longitudinal direction.

As illustrated in FIG. 4, the auxiliary gear 40 includes stepped portions 40D around the third shaft 43 and on the side facing the first frame 91 and the side facing the second frame 92, respectively. The auxiliary gear 40 is disposed such that the stepped portions 40D face the first frame 91 and the second frame 92, respectively, with a slight gap left therebetween. Such an arrangement may thus reduce rattling of the auxiliary gear 40 in the first axis direction.

As illustrated in FIG. 5, when the third shaft 43 of the auxiliary gear 40 is located at a particular position where the third shaft 43 is in contact with the first end 60A of the second guide portion 60 and the first end 60A restricts a further movement of the third shaft 43 toward the first end 60A, the auxiliary gear 40 is located nearest to the driven gear 20. At this position, the auxiliary gear 40 is in mesh with the planet gear 30 located at the disengaged position.

As illustrated in FIG. 6, when the third shaft 43 of the auxiliary gear 40 is located at a particular position where the third shaft 43 is in contact with the second end 60B of the second guide portion 60 and the second end 60B restricts a further movement of the third shaft 43 toward the second end 60B, the auxiliary gear 40 is spaced farthest from the driven gear 20. At this position, the auxiliary gear 40 is also in mesh with the planet gear 30 located at the engaged position.

As illustrated in FIGS. 7 and 8, as the third shaft 43 of the auxiliary gear 40 moves between the first end 60A and the second end 60B of the second guide portion 60 while contacting the first guide surface 61 and the second guide surface 62, the second shaft 32 of the planet gear 30 in constant mesh with the auxiliary gear 40 moves correspondingly in a direction opposite to the direction in which the third shaft 43 of the auxiliary gear 40 moves.

As illustrated in FIG. 5, as viewed in the first axis direction, the third axis X43 of the third shaft 43 is positioned opposite to the driven gear 20 relative to the first imaginary line K1. In the first illustrative embodiment, as viewed in the first axis direction, the entirety of the third shaft 43 is positioned opposite to the driven gear 20 relative to the first imaginary line K1.

As illustrated in FIGS. 5 to 8, an imaginary line segment K3 is defined as viewed in the first axis direction. The imaginary line segment K3 connects between the second axis X32 of the second shaft 32 and the third axis X43 of the third shaft 43. An interior angle formed by the second imaginary line K2 and the imaginary line segment K3 is defined as an interior angle α1. The imaginary line segment K3 has a length L1.

The interior angle α1 is set to decrease as the planet gear 30 moves from the disengaged position (refer to FIG. 5) toward the engaged position (refer to FIG. 6). The first guide surface 61 and the second guide surface 62 of the second guide portion 60 are curved such that, when the planet gear 30 moves between the engaged position (refer to FIG. 6) and the disengaged position (refer to FIG. 5), the first guide surface 61 and the second guide surface 62 guide the third shaft 43 with the length L1 of the imaginary line segment K3 remaining constant.

In the first illustrative embodiment, the second guide portion 60 functions to maintain the length L1 of the imaginary line segment K3 constant to a particular length that may be equal to a sum of a radius of a pitch circle of the planet gear 30 and a radius of a pitch circle of the auxiliary gear 40. Such a configuration may thus restrict changing (e.g., becoming shallower or deeper) in the meshing depth of the planet gear 30 and the auxiliary gear 40.

Actions and Effects

In the gear transmission device 1 according to the first illustrative embodiment, due to effect of the auxiliary gear 40, the first guide portion 50, and the second guide portion 60, the planet gear 30 moves between the engaged position (refer to FIG. 6) and the disengaged position (refer to FIG. 5).

For color printing, as the sun gear 10 rotates in the first direction R1 in response to the drive source M1 rotating in the forward direction, the planet gear 30 moves from the disengaged position (refer to FIG. 5) toward the engaged position. When the planet gear 30 reaches a particular position (refer to FIG. 7), the planet gear 30 receives a pressing force FG1 from the sun gear 10 via interlocking teeth to move toward the engaged position. In response to the sun gear 10 rotating in the first direction R1, the planet gear 30 rotates in the clockwise direction in FIG. 7.

In response to the planet gear 30 rotating in the clockwise direction, the auxiliary gear 40 always meshing with the planet gear 30 rotates in a direction opposite to the rotating direction of the planet gear 30. Thus, a pressing force FG2 acts on the auxiliary gear 40 from the planet gear 30 via interlocking teeth. Due to the effect of the pressing force FG2, the third shaft 43 of the auxiliary gear 40 is pressed against the first guide surface 61 of the second guide portion 60 while rotating, and thus the auxiliary gear 40 moves in a direction away from the driven gear 20.

At the same time, a pressing force that attempts to separate the second shaft 32 of the planet gear 30 and the third shaft 43 of the auxiliary gear 40 from each other generates due to an operating pressure angle of the planet gear 30 and the auxiliary gear 40. Such a pressing force thus acts on contacting surfaces of the third shaft 43 and the first guide surface 61 of the second guide portion 60. Due to the effect of such a pressing force, a repulsive force FR2 acting in a direction to press the planet gear 30 toward the engaged position acts on the planet gear 30 from the auxiliary gear 40 via interlocking teeth.

Although a repulsive force FR3 for a pressing force FG3 that the driven gear 20 receives from the planet gear 30 acts on the planet gear 30, the repulsive force FR2 and the pressing force FG1 are sufficiently greater than a component of the repulsive force FR3 acting in a direction opposite to the moving direction of the planet gear 30.

Thus, under the action of the repulsive force FR2 and the pressing force FG1, the second shaft 32 moves in the opposite direction to the direction in which the third shaft 43 moves while the second shaft 32 is guided by the first guide portion 50. Such an action may thus enable the planet gear 30 to move to the engaged position (refer to FIG. 6) smoothly. A friction force generated due to the pressing force acting on contacting surfaces of the third shaft 43 and the first guide surface 61 of the second guide portion 60 contributes to the movement of the auxiliary gear 40 in the direction in which the auxiliary gear 40 moves by its rotation.

As illustrated in FIGS. 5 and 6, as viewed in the first axis direction, the interior angle $\alpha1$ formed by the second imaginary line K2 and the imaginary line segment K3 is set to decrease as the planet gear 30 moves from the disengaged position toward the engaged position. That is, the auxiliary gear 40 moves to the opposite side to the driven gear 20 relative to the planet gear 30 moving toward the engaged position. Such a movement may thus enable the auxiliary gear 40 to effectively exert, on the planet gear 30 via interlocking teeth, the repulsive force FR2 acting in the direction to press the planet gear 30 toward the engaged position. Consequently, the planet gear 30 may move to the engaged position more smoothly.

After the planet gear 30 reaches the engaged position (refer to FIG. 6), the sun gear 10 continues rotating in the first direction R1. Thus, the gear transmission device 1 allows transmission of the drive force from the drive source M1 to the second transmission unit G2 via the driven gear 20. At the same time, the drive force of the drive source M1 is also transmitted to the first transmission unit G1 via the rotating direction control mechanism G3. Thus, all of the developing rollers 5E rotate to perform color printing.

For monochrome printing, as the sun gear 10 rotates in the second direction R2 in response to the drive source M1 rotating in the reverse direction, the planet gear 30 moves from the engaged position (refer to FIG. 6) toward the disengaged position. When the planet gear 30 reaches a particular position (refer to FIG. 8), the planet gear 30 receives a pressing force FG4 from the sun gear 10 via interlocking teeth. When the planet gear 30 attempts to rotate in the counterclockwise direction in FIG. 8, a load of the second transmission unit G2 is applied to the driven gear 20 meshing with the planet gear 30, thereby causing the driven gear 20 hard to rotate. Thus, a repulsive force FR5 for a pressing force FG5 that the driven gear 20 receives from the planet gear 30 acts on the planet gear 30 via interlocking teeth. The repulsive force FR5 and the pressing force FG4 cause the planet gear 30 to be repelled from the driven gear 20. The planet gear 30 thus moves toward the disengaged position.

In response to the planet gear 30 rotating in the counterclockwise direction, the auxiliary gear 40 always meshing with the planet gear 30 rotates in a direction opposite to the rotating direction of the planet gear 30. Thus, a pressing force FG6 acts on the auxiliary gear 40 from the planet gear 30 via interlocking teeth. Due to the effect of the pressing force FG6, the third shaft 43 of the auxiliary gear 40 is pressed against the first guide surface 61 of the second guide portion 60 while rotating, and thus the auxiliary gear 40 moves in a direction in which the auxiliary gear 40 approaches the driven gear 20.

At the same time, a pressing force that attempts to separate the second shaft 32 of the planet gear 30 and the third shaft 43 of the auxiliary gear 40 from each other generates due to an operating pressure angle of the planet gear 30 and the auxiliary gear 40. Such a pressing force thus acts on contacting surfaces of the third shaft 43 and the first guide surface 61 of the second guide portion 60. Due to the effect of such a pressing force, a repulsive force FR6 acting in a direction to press the planet gear 30 toward the disengaged position acts on the planet gear 30 from the auxiliary gear 40 via interlocking teeth.

Thus, under the action of the repulsive force FR6 and the pressing force FG4, the second shaft 32 moves in the opposite direction to the direction in which the third shaft 43 moves while the second shaft 32 is guided by the first guide portion 50. Such an action may thus enable the planet gear 30 to move to the disengaged position (refer to FIG. 5) smoothly. A friction force generated due to the pressing force acting on contacting surfaces of the third shaft 43 and the first guide surface 61 of the second guide portion 60 contributes to the movement of the auxiliary gear 40 in the direction in which the auxiliary gear 40 moves by its rotation.

It is assumed that, in the gear transmission device 1, when the auxiliary gear 40 changes the place, the third shaft 43 moves via the first imaginary line K1 from a near side to a far side that is opposite to the near side relative to the first imaginary line K1. When the third shaft 43 is located on the near side, the third shaft 43 is located on the same side as the side on which the driven gear 20 is located relative to the first imaginary line K1. When the third shaft 43 is located on the far side, the third shaft 43 is located opposite to the driven gear 20 relative to the first imaginary line K1. In such a case, when the third axis X43 of the third shaft 43 crosses the first imaginary line K1, a load of the auxiliary gear 40 on the planet gear 30 may reach its peak. Nevertheless, in the gear transmission device 1 according to the first illustrative embodiment, as illustrated in FIG. 5, as viewed in the first axis direction, the entirety of the third shaft 43 is positioned opposite to the driven gear 20 relative to the first imaginary line K1. Thus, when the auxiliary gear 40 changes the place, the third shaft 43 does not need to pass the position at which the load of the auxiliary gear 40 on the planet gear 30 may reach its peak. Such a configuration may thus enable the auxiliary gear 40 to also move smoothly.

As illustrated in FIGS. 5 and 6, while the planet gear 30 moves between the engaged position and the disengaged position, the first guide surface 61 and the second guide surface 62 guide the third shaft 43 with the length L1 of the imaginary line segment K3 remaining constant. Such a configuration may thus enable the meshing depth of the auxiliary gear 40 with the planet gear 30 to be maintained constant, thereby enabling the auxiliary gear 40 to move more smoothly and also the planet gear 30 to move more smoothly in the opposite direction to the moving direction of the auxiliary gear 40.

In contrast to the known gear transmission device, the gear transmission device 1 according to the first illustrative embodiment eliminates the need to press the planet gear 30 against the first frame 91 or the second frame 92 at all times by the urging force acting in the direction parallel to the first axis X11. Thus, the friction force to be generated between contacting surfaces of the planet gear 30 and the frame 90 may be reduced significantly.

Consequently, such a configuration may reduce a driving load that may act in the gear transmission device 1 according to the first illustrative embodiment, thereby reducing noise and power consumption in the image forming apparatus 9 including the gear transmission device 1.

In the gear transmission device 1, the second guide portion 60 is configured to, while the planet gear 30 moves between the engaged position and the disengaged position, guide the third shaft 43 such that the auxiliary gear 40 stays meshed with the planet gear 30. Such a configuration may enable the auxiliary gear 40 to act on the planet gear 30 in the entire moving range of the planet gear 30, thereby enabling the planet gear 30 to move more smoothly between the engaged position and the disengaged position.

In the gear transmission device 1, as illustrated in FIG. 4, the outside diameter D40 of the auxiliary gear 40 is less than the outside diameter D30 of the planet gear 30. Thus, the number of rotations of the auxiliary gear 40 per unit time is greater than the number of rotations of the planet gear 30 per unit time. Such a configuration may thus enable the sliding speed of the third shaft 43 to be increased when the third shaft 43 of the auxiliary gear 40 contacts the first guide surface 61 of the second guide portion 60 while rotating. Consequently, the auxiliary gear 40 has a relatively high reactivity, thereby enabling the planet gear 30 to move more smoothly between the engaged position and the disengaged position.

In the gear transmission device 1, as illustrated in FIGS. 2 and 4, the first frame 91 and the second frame 92 include the first guide portions 50, respectively. The first guide portions 50 are configured to, when the second shaft 32 of the planet gear 30 moves backward and forward in the first guide portions 50, guide the second shaft 32. The first frame 91 and the second frame 92 further include the second guide portions 60, respectively. The second guide portions 60 are configured to, when the third shaft 43 of the auxiliary gear 40 moves backward and forward in the second guide portions 60, guide the third shaft 43. Such a configuration may thus restrict inclination of the planet gear 30 and the auxiliary gear 40 relative to the first axis direction. Consequently, the planet gear 30 may move more smoothly between the engaged position (refer to FIG. 6) and the disengaged position (refer to FIG. 5).

Second Illustrative Embodiment

As illustrated in FIGS. 9 to 14, a gear transmission device 2 includes an auxiliary gear 240 as an alternative to the auxiliary gear 40 of the gear transmission device 1. The gear transmission device 2 further includes second guide portions 260 as alternatives to the second guide portions 60 of the gear transmission device 1. In the gear transmission device 1, each first guide portion 50 has the first end 50A and the second end 50B each having a curved surface. Nevertheless, in the gear transmission device 2, each first guide portion 50 has a first end 50A and a second end 50B each having a flat surface that forms a straight line as viewed in the first axis direction. In the gear transmission device 2, the first end 50A and the second end 50B contact the second shaft 32 of the planet gear 30 and restrict a further movement of the second shaft 32 as with those in the gear transmission device 1.

The gear transmission device 2 as an alternative to the gear transmission device 1 according to the first illustrative embodiment is located between a drive source M1 and a second transmission unit G2 in the first drive force transmission route in the image forming apparatus 9.

The other configuration adopted in the second illustrative embodiment is the same or similar to the configuration adopted in the first illustrative embodiment. For example, for simplicity's sake, the relative positional relationship between the sun gear 10, the driven gear 20, and the planet gear 30 and the outside diameters of the sun gear 10, the driven gear 20, and the planet gear 30 according the second illustrative embodiment are illustrated slightly different from those according to the first illustrative embodiment. Nevertheless, those adopted in the second illustrative embodiment are substantially the same as those adopted in the first illustrative embodiment. Therefore, the positions and inclinations of the first imaginary line K1 and the second imaginary line K2 according to the second illustrative embodiment are illustrated also slightly different from those according to the first illustrative embodiment. Nevertheless, those adopted in the second illustrative embodiment are substantially the same as those adopted in the first illustrative embodiment. In the second illustrative embodiment, common components or elements have the same reference numerals as those of the first illustrative embodiment, and the detailed description of the common components or elements is omitted.

Figure 9:
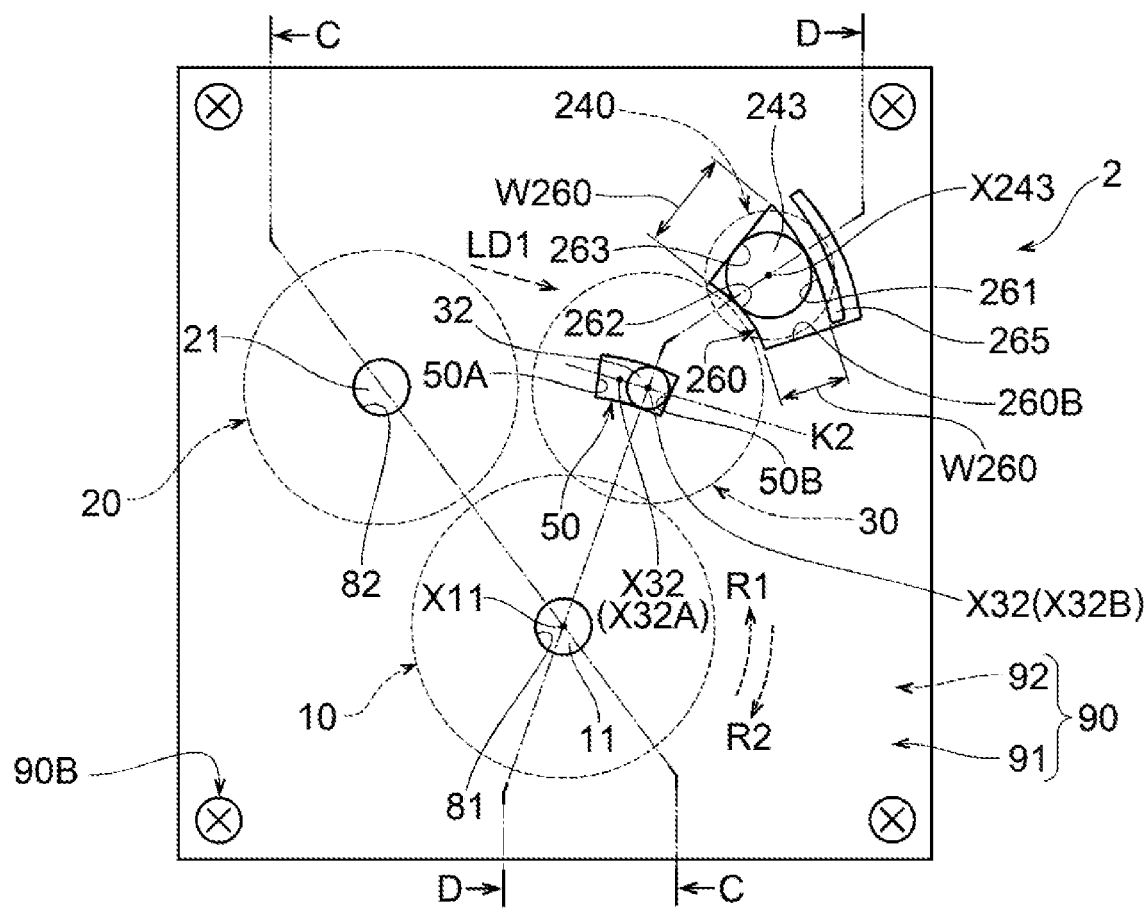
FIG. 9 is a plan view of a gear transmission device according to a second illustrative embodiment of the disclosure.

The C-C section of the gear transmission device 2 in FIG. 9 is a cross section cut in the same way as the A-A section of the gear transmission device 1 in FIG. 2. Thus, FIG. 3 also illustrates the C-C section of the gear transmission device 2 in FIG. 9. In the gear transmission device 2, in a similar manner to the first illustrative embodiment, a first shaft 11 of the sun gear 10 is connected to the drive source M1. The sun gear 10 is configured to, in response to the drive source M1 rotating selectively in one of a forward direction and a reverse direction, rotate correspondingly in one of a first direction R1 and a second direction R2. A rotating shaft 21 of the driven gear 20 is connected to a second transmission unit G2.

Figure 10:
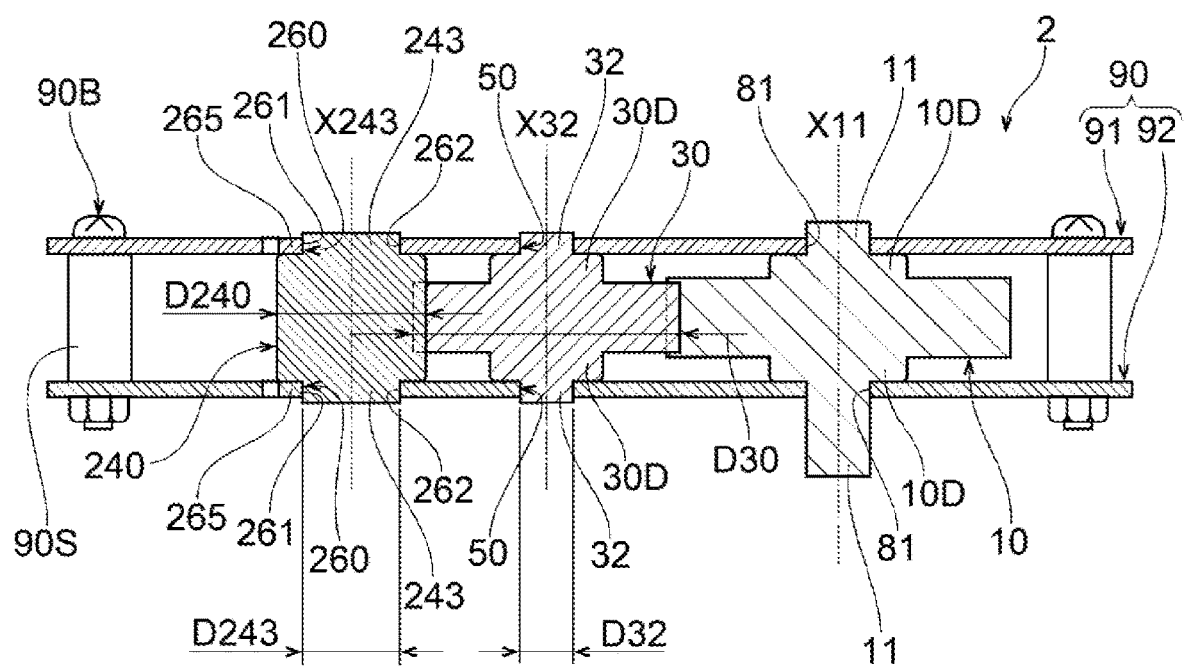
FIG. 10 is a sectional view of the gear transmission device taken along line D-D of FIG. 9 according to the second illustrative embodiment of the disclosure.
Figure 11:
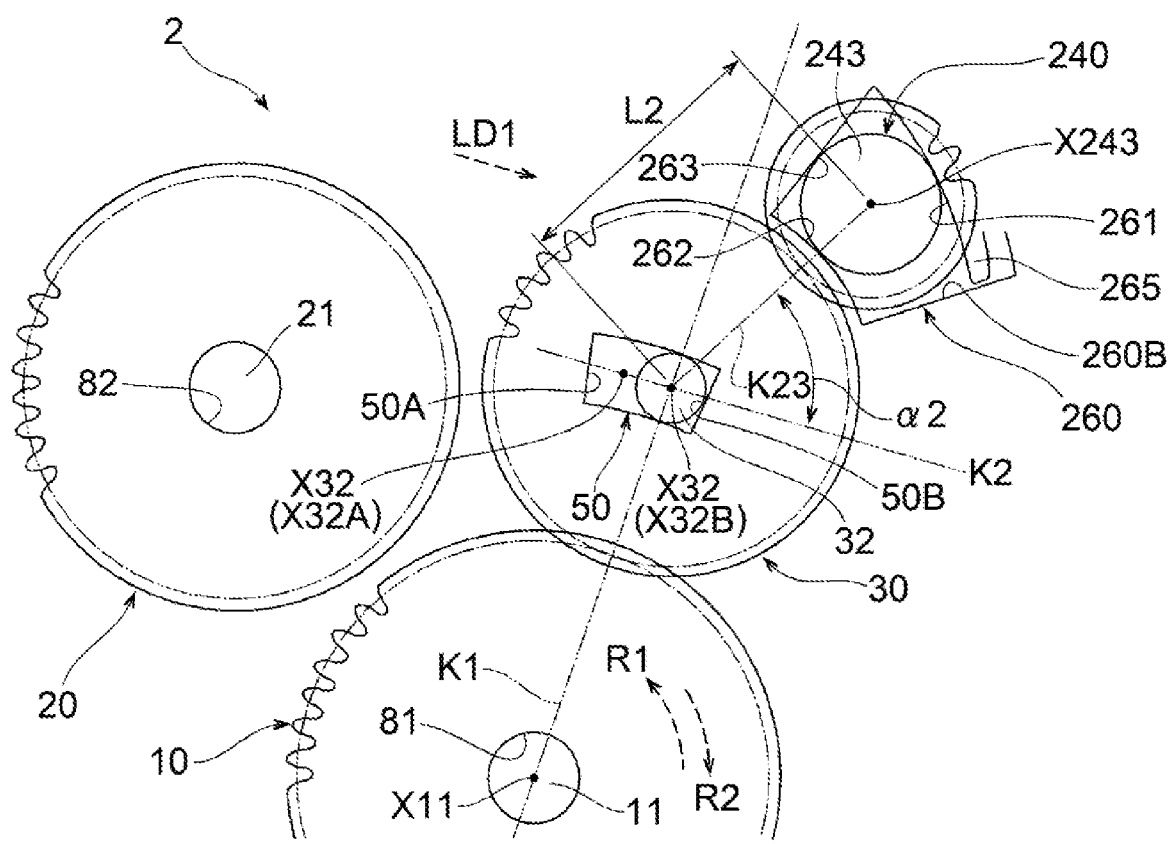
FIG. 11 is a schematic partial front view illustrating a relative positional relationship between a sun gear, a driven gear, a planet gear at a disengaged position, an auxiliary gear, a first guide portion, and a second guide portion according to the second illustrative embodiment of the disclosure.

As illustrated in FIGS. 10 and 11, like the planet gear 30 according to the first illustrative embodiment, the planet gear 30 according to the second illustrative embodiment includes a second shaft 32 and stepped portions 30D. The planet gear 30 is configured to move between an engaged position (refer to FIG. 12) and a disengaged position (refer to FIGS. 9 and 11).

The auxiliary gear 240 of the gear transmission device 2 may be a spur gear similar to the auxiliary gear 40 according to the first illustrative embodiment. As illustrated in FIG. 10, the auxiliary gear 240 has an outside diameter D240, and the planet gear 30 has an outside diameter D30. The outside diameter D240 of the auxiliary gear 240 is less than the outside diameter D30 of the planet gear 30.

The auxiliary gear 240 has a one-piece structure including a third shaft 243. The third shaft 243 may be a cylindrical shaft that extends parallel to the first shaft 11. The third shaft 243 has a third axis X243 as its center. The third shaft 243 protrudes from each side of the auxiliary gear 240 toward the first frame 91 or toward the second frame 92. The third shaft 243 has an outside diameter D243, and the second shaft 32 has an outside diameter D32. The outside diameter D243 of the third shaft 243 is greater than the outside diameter D32 of the second shaft 32.

As illustrated in FIGS. 9 to 12, a first frame 91 and a second frame 92 include second guide portions 260, respectively. Like the first guide portions 50, the second guide portions 260 may be grooves that penetrate the first frame 91 and the second frame 92, respectively. The second guide portions 260 are engaged with the third shaft 243 of the auxiliary gear 240 by insertion.

Both of the second guide portions 260 may have the same configuration and function, and hereinafter, the description is thus provided with respect to one of the second guide portions 260. As illustrated in FIG. 11, as viewed in the first axis direction, the second guide portion 260 is positioned opposite to the driven gear 20 relative to the first imaginary line K1 and opposite to the sun gear 10 relative to the second imaginary line K2.

The second guide portion 260 has a first end and a second end 260B in its longitudinal direction. A direction in which the planet gear 30 moves toward the disengaged position from the engaged position may be defined as a separating direction LD1. The first end is an upstream end in the separating direction LD1 and has a stopper surface 263. The stopper surface 263 is positioned closer to the first imaginary line K1 than the second end 260B is to the first imaginary line K1, and farther from the second imaginary line K2 than the second end 260B is from the second imaginary line K2. The stopper surface 263 is contactable with the third shaft 243.

The second guide portion 260 has a first guide surface 261 and a second guide surface 262. The first guide surface 261 and the second guide surface 262 are another example of the guide surface of the second guide portion.

The stopper surface 263 has one end and the other end. The one end of the stopper surface 263 is close to the planet gear 30 than the other end of the stopper surface 263 is to the planet gear 30. The second end 260B of the second guide portion 260 has one end and the other end. The one end of the second end 260B is closer to the planet gear 30 than the other end of the second end 260B is to the planet gear 30. In the second guide portion 260, the second guide surface 262 extends from the one end of the stopper surface 263 to the one end of the second end 260B. The second guide surface 262 is positioned closer to the planet gear 30 than the first guide surface 261 to the planet gear 30 in a radial direction of the planet gear 30, and is contactable with the third shaft 243.

The second guide portion 260 includes a flexible portion 265. The flexible portion 265 is connected to the other end of the stopper surface 263. The flexible portion 265 is cantilevered from the other end of the stopper surface 263 toward the other end of the second end 260B.

The flexible portion 265 has the first guide surface 261 at its surface facing the second guide surface 262. The first guide surface 261 extends from the other end of the stopper surface 263 toward the other end of the second end 260B. The first guide surface 261 ends without reaching the second end 260B. The first guide surface 261 is positioned farther from the planet gear 30 than the second guide surface 262 is from the planet gear 30 in a radial direction of the planet gear 30, and is contactable with the third shaft 243. The flexible portion 265 is elastically deformable to enable the first guide surface 261 to move in a direction away from the second guide surface 262.

As illustrated in FIG. 9, the first guide surface 261 and the second guide surface 262 face each other and are spaced from each other by a gap W260. The gap W260 is set to decrease as the second guide portion 260 extends substantially in the separating direction LD1.

As illustrated in FIGS. 11 to 14, the first guide surface 261 and the second guide surface 262 of the second guide portion 260 are configured to, when the third shaft 243 moves in the second guide portion 260, guide the third shaft 243 such that the third shaft 243 moves between a first particular position and a second particular position. The first particular position may refer to a position where the third shaft 243 is in contact with the stopper surface 263 and the stopper surface 263 restricts a further movement of the third shaft 243 toward the stopper surface 263. The second particular position may refer to a position where the third shaft 243 is separated from the stopper surface 263 toward the second end 260B and is held strongly and lodged between the first guide surface 261 and the second guide surface 262. That is, the auxiliary gear 240 is supported by the frame 90 such that the auxiliary gear 240 rotates about the third axis X243 and moves along the second guide portion 260 in the longitudinal direction.

As illustrated in FIG. 10, the auxiliary gear 240 is disposed such that its side surfaces face the first frame 91 and the second frame 92, respectively, with a slight gap left therebetween. Such an arrangement may thus reduce rattling of the auxiliary gear 240 in the first axis direction.

As illustrated in FIG. 11, when the third shaft 243 of the auxiliary gear 240 is located at the first particular position, the auxiliary gear 240 is located nearest to the driven gear 20. At this position, the auxiliary gear 240 is in mesh with the planet gear 30 located at the disengaged position. The spacing of the gap W260 between the first guide surface 261 and the second guide surface 262 is determined such that when the auxiliary gear 240 is located at such a position, the first guide surface 261 and the second guide surface 262 can lightly hold the auxiliary gear 240 therebetween or slightly contact the auxiliary gear 240.

Figure 12:
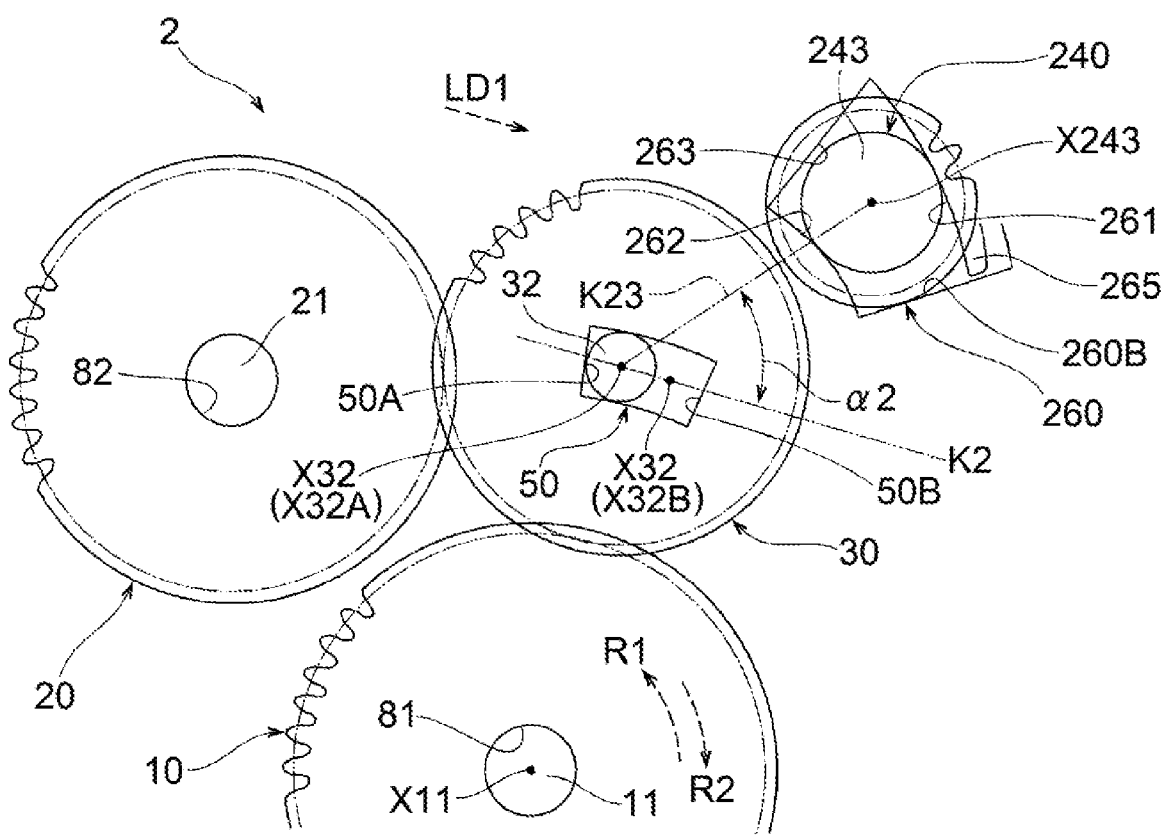
FIG. 12 is a schematic partial front view illustrating the relative positional relationship between the sun gear, the driven gear, the planet gear at an engaged position, the auxiliary gear, the first guide portion, and the second guide portion according to the second illustrative embodiment of the disclosure.

As illustrated in FIG. 12, when the third shaft 243 of the auxiliary gear 240 is located at the second particular position, the auxiliary gear 240 is spaced farthest from the driven gear 20. At this position, the auxiliary gear 240 is spaced from the planet gear 30 located at the engaged position.

That is, the second guide portion 260 guides the third shaft 243 such that, while the planet gear 30 moves from the disengaged position to a particular position back from the engaged position, the auxiliary gear 240 continues meshing with the planet gear 30, and such that, as the planet gear 30 reaches the engaged position, the auxiliary gear 240 moves away from the planet gear 30.

Figure 13:
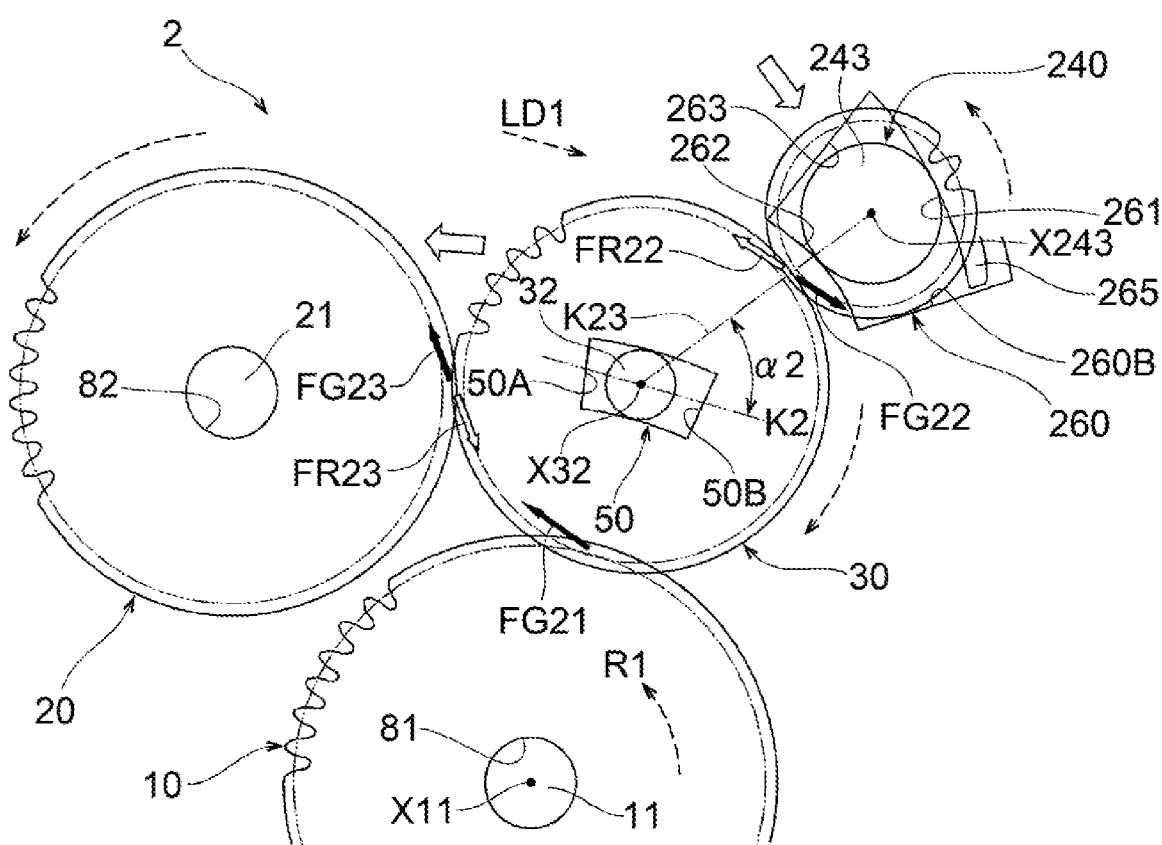
FIG. 13 is a schematic partial front view illustrating the relative positional relationship between the sun gear, the driven gear, the planet gear, the auxiliary gear, the first guide portion, and the second guide portion before establishment of the relationship of FIG. 12 and after establishment of the relationship of FIG. 11 according to the second illustrative embodiment of the disclosure.

As illustrated in FIG. 13, as the third shaft 243 of the auxiliary gear 240 moves toward the second end 260B from the first particular position with contacting the first guide surface 261 and the second guide surface 262, the holding force of the first guide surface 261 and the second guide surface 262 holding the third shaft 243 becomes stronger and a friction force acting on the third shaft 243 increases.

Figure 14:
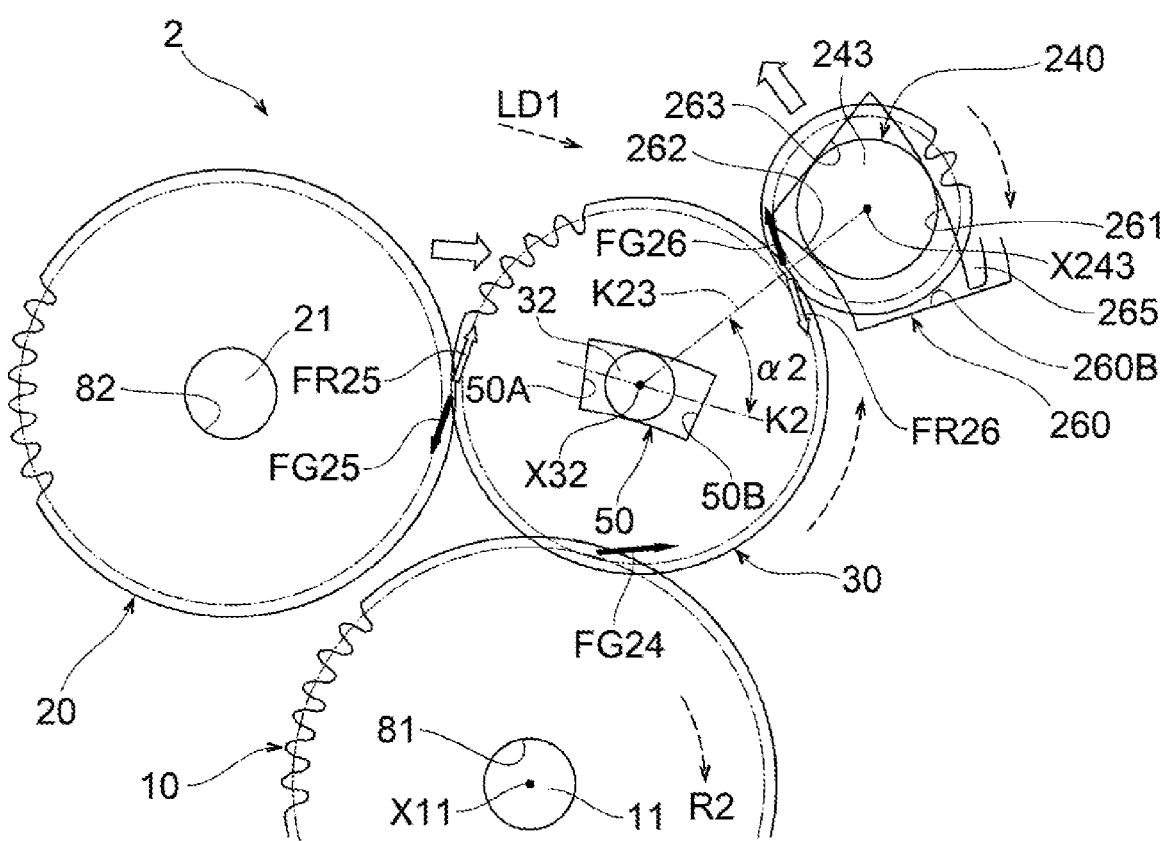
FIG. 14 is a schematic partial front view illustrating the relative positional relationship between the sun gear, the driven gear, the planet gear, the auxiliary gear, the first guide portion, and the second guide portion before establishment of the relationship of FIG. 11 and after establishment of the relationship of FIG. 12 according to the second illustrative embodiment of the disclosure.

As illustrated in FIG. 14, as the third shaft 243 of the auxiliary gear 240 moves toward the stopper surface 263 from the second end 260B side (e.g., the second particular position) with contacting the first guide surface 261 and the second guide surface 262, the holding force of the first guide surface 261 and the second guide surface 262 holding the third shaft 243 becomes weaker and the friction force acting on the third shaft 243 decreases.

Such an auxiliary gear 240 and the second guide portion 260 may thus enable the second shaft 32 of the planet gear 30 to move correspondingly in a direction opposite to the direction in which the third shaft 243 of the auxiliary gear 240 moves.

As illustrated in FIGS. 11 to 14, the distance that the second guide portion 260 guides the third shaft 243 is slightly exaggerated for purposes of illustration. In actual configuration, the spacing of the gap W260 between the first guide surface 261 and the second guide surface 262 may be determined as appropriate to set the guiding distance to be infinitesimal.

As illustrated in FIG. 11, as viewed in the first axis direction, the third axis X243 of the third shaft 243 is positioned opposite to the driven gear 20 relative to the first imaginary line K1. In the second illustrative embodiment, as viewed in the first axis direction, the entirety of the third shaft 243 is positioned opposite to the driven gear 20 relative to the first imaginary line K1.

As illustrated in FIGS. 11 to 14, an imaginary line segment K23 is defined as viewed in the first axis direction. The imaginary line segment K23 connects between the second axis X32 of the second shaft 32 and the third axis X243 of the third shaft 243. An interior angle formed by the second imaginary line K2 and the imaginary line segment K23 is defined as an interior angle α2. As illustrated in FIG. 11, the imaginary line segment K23 has a length L2.

The interior angle α2 is set to decrease as the planet gear 30 moves from the disengaged position (refer to FIG. 11) toward the engaged position (refer to FIG. 12). The second guide surface 262 of the second guide portion 260 is curved to extend toward the sun gear 10 as the second guide surface 262 extends substantially in the separating direction LD1. The first guide surface 261 of the second guide portion 260 is curved to extend toward the second guide surface 262 as the first guide surface 261 extends substantially in the separating direction LD1, thereby enabling the first guide surface 261 to press the third shaft 243 against the second guide surface 262.

In the second illustrative embodiment, as illustrated in FIG. 11, the spacing of the gap W260 between the second guide surface 262 and the first guide surface 261 of the second guide portion 260 is determined such that, in a state where the third shaft 243 of the auxiliary gear 240 is in contact with the stopper surface 263, the length L2 of the imaginary line segment K23 is equal to a sum of a radius of a pitch circle of the planet gear 30 and a radius of a pitch circle of the auxiliary gear 240. Such a configuration may thus maintain the meshing depth of the planet gear 30 and the auxiliary gear 240 when the planet gear 30 is located at the disengaged position.

Actions and Effects

In the gear transmission device 2 according to the second illustrative embodiment, due to effect of the auxiliary gear 240, the first guide portion 50, and the second guide portion 260, the planet gear 30 moves between the engaged position (refer to FIG. 12) and the disengaged position (refer to FIG. 11).

For color printing, as the sun gear 10 rotates in the first direction R1 in response to the drive source M1 rotating in the forward direction, the planet gear 30 moves from the disengaged position (refer to FIG. 11) toward the engaged position. When the planet gear 30 reaches a particular position (refer to FIG. 13), the planet gear 30 receives a pressing force FG21 from the sun gear 10 via interlocking teeth to move toward the engaged position. In response to the sun gear 10 rotating in the first direction R1, the planet gear 30 rotates in the clockwise direction in FIG. 13.

In response to the planet gear 30 rotating in the clockwise direction, the auxiliary gear 240 meshing with the planet gear 30 located at the disengaged position rotates in a direction opposite to the rotating direction of the planet gear 30. Thus, a pressing force FG22 acts on the auxiliary gear 240 from the planet gear 30 via interlocking teeth. Due to the effect of the pressing force FG22, the third shaft 243 of the auxiliary gear 240 is pressed against the first guide surface 261 and the second guide surface 262 of the second guide portion 260 while rotating, and thus the auxiliary gear 240 moves in a direction away from the driven gear 20.

At that time, a friction force is generated between contacting surfaces of the third shaft 243, the first guide surface 261, and the second guide surface 262. Due to the effect of such a friction force, a repulsive force FR22 acting in a direction to press the planet gear 30 toward the engaged position acts on the planet gear 30 from the auxiliary gear 240 via interlocking teeth.

Thus, under the action of the repulsive force FR22 and the pressing force FG21, the second shaft 32 moves in the opposite direction to the direction in which the third shaft 243 moves while the second shaft 32 is guided by the first guide portion 50. Then, as the planet gear 30 moves toward the engaged position (refer to FIG. 12), the meshing depth of the planet gear 30 and the auxiliary gear 240 becomes shallower gradually and the planet gear 30 comes into mesh with the driven gear 20. That is, a tip of one or more teeth of the planet gear 30 always meshing with the sun gear 10 contacts a tip of one or more teeth of the driven gear 20 and a tip of one or more teeth of the auxiliary gear 240 momentarily. Although a repulsive force FR23 for a pressing force FG23 that the driven gear 20 receives from the planet gear 30 acts on the planet gear 30, the repulsive force FR22 and the pressing force FG21 are sufficiently greater than a component of the repulsive force FR23 acting in a direction opposite to the moving direction of the planet gear 30.

Thereafter, the auxiliary gear 240 comes disengaged from the planet gear 30 and the meshing depth of the planet gear 30 and the driven gear 20 becomes deeper. Consequently, the planet gear 30 may move to the engaged position (refer to FIG. 12) smoothly.

As illustrated in FIGS. 11 and 12, as viewed in the first axis direction, the interior angle α2 formed by the second imaginary line K2 and the imaginary line segment K23 is set to decrease as the planet gear 30 moves from the disengaged position toward the engaged position. That is, the auxiliary gear 240 moves to the opposite side to the driven gear 20 relative to the planet gear 30 moving toward the engaged position. Such a movement may thus enable the auxiliary gear 240 to effectively exert, on the planet gear 30 via interlocking teeth, the repulsive force FR22 acting in the direction to press the planet gear 30 toward the engaged position. Consequently, the planet gear 30 may move to the engaged position more smoothly.

After the planet gear 30 reaches the engaged position (refer to FIG. 12), the sun gear 10 continues rotating in the first direction R1. Thus, the gear transmission device 2 allows transmission of the drive force from the drive source M1 to the second transmission unit G2 via the driven gear 20. At the same time, the drive force of the drive source M1 is also transmitted to the first transmission unit G1 via the rotating direction control mechanism G3. Thus, all of the developing rollers 5E rotate to perform color printing.

For monochrome printing, as the sun gear 10 rotates in the second direction R2 in response to the drive source M1 rotating in the reverse direction, the planet gear 30 moves from the engaged position (refer to FIG. 12) toward the disengaged position. When the planet gear 30 reaches a particular position (refer to FIG. 14), the planet gear 30 receives a pressing force FG24 from the sun gear 10 via interlocking teeth. When the planet gear 30 attempts to rotate in the counterclockwise direction in FIG. 14, a load of the second transmission unit G2 is applied to the driven gear 20 meshing with the planet gear 30, thereby causing the driven gear 20 hard to rotate. Thus, a repulsive force FR25 for a pressing force FG25 that the driven gear 20 receives from the planet gear 30 acts on the planet gear 30 via interlocking teeth. The repulsive force FR25 and the pressing force FG24 cause the planet gear 30 to be repelled from the driven gear 20. The planet gear 30 thus moves toward the disengaged position.

Thus, the meshing depth of the planet gear 30 and the driven gear 20 becomes shallower gradually and the planet gear 30 comes into mesh with the auxiliary gear 240. That is, a tip of one or more teeth of the planet gear 30 always meshing with the sun gear 10 contacts a tip of one or more teeth of the driven gear 20 and a tip of one or more teeth of the auxiliary gear 240 momentarily. Thereafter, the auxiliary gear 240 comes disengaged from the planet gear 30 and the meshing depth of the planet gear 30 and the driven gear 20 becomes deeper. The auxiliary gear 240 thus starts rotating in a direction opposite to the rotating direction of the planet gear 30. Thus, a pressing force FG26 acts on the auxiliary gear 240 from the planet gear 30 via interlocking teeth. Due to the effect of the pressing force FG26, the auxiliary gear 240 moves in a direction in which the auxiliary gear 240 approaches the driven gear 20, and the third shaft 243 of the auxiliary gear 240 is pressed against the stopper surface 263 while rotating.

At that time, a friction force is generated between contacting surfaces of the third shaft 243, the stopper surface 263, and the second guide surface 262. Due to the effect of such a friction force, a repulsive force FR26 acting in a direction to press the planet gear 30 toward the disengaged position acts on the planet gear 30 from the auxiliary gear 240 via interlocking teeth.

Thus, under the action of the repulsive force FR26 and the pressing force FG24, the second shaft 32 moves in the opposite direction to the direction in which the third shaft 243 moves while the second shaft 32 is guided by the first guide portion 50. Such an action may thus enable the planet gear 30 to move to the disengaged position (refer to FIG. 11) smoothly.

It is assumed that, in the gear transmission device 2, when the auxiliary gear 240 changes the place, the third shaft 243 moves via the first imaginary line K1 from a near side to a far side that is opposite to the near side relative to the first imaginary line K1. When the third shaft 243 is located on the near side, the third shaft 243 is located on the same side as the side on which the driven gear 20 is located relative to the first imaginary line K1. When the third shaft 243 is located on the far side, the third shaft 243 is located opposite to the driven gear 20 relative to the first imaginary line K1. In such a case, when the third axis X243 of the third shaft 243 crosses the first imaginary line K1, a load of the auxiliary gear 240 on the planet gear 30 may reach its peak. Nevertheless, in the gear transmission device 2 according to the second illustrative embodiment, as illustrated in FIG. 11, as viewed in the first axis direction, the entirety of the third shaft 243 is positioned opposite to the driven gear 20 relative to the first imaginary line K1. Thus, when the auxiliary gear 240 changes the place, the third shaft 243 does not need to pass the position at which the load of the auxiliary gear 240 on the planet gear 30 may reach its peak. Such a configuration may thus enable the auxiliary gear 240 to also move smoothly.

In contrast to the known gear transmission device, the gear transmission device 2 according to the second illustrative embodiment eliminates the need to press the planet gear 30 against the first frame 91 or the second frame 92 at all times by the urging force acting in the direction parallel to the first axis X11. Thus, the friction force to be generated between the planet gear 30 and the frame 90 may be reduced significantly.

Consequently, as with the first illustrative embodiment, such a configuration may reduce a driving load that may act in the gear transmission device 2 according to the second illustrative embodiment, thereby reducing noise and power consumption in the image forming apparatus 9 including the gear transmission device 2.

In the gear transmission device 2, the flexible portion 265 is elastically deformable to enable the first guide surface 261 to move in the direction away from the second guide surface 262. As illustrated in FIG. 14, such a configuration may thus enable the first guide surface 261 and the second guide surface 262 to properly hold the third shaft 243 of the auxiliary gear 240 therebetween until the planet gear 30 reaches the disengaged position (refer to FIG. 11) after the auxiliary gear 240 comes into mesh with the planet gear 30 in response to the sun gear 10 rotating in the second direction R2, thereby maintaining the proper state of meshing between the auxiliary gear 240 and the planet gear 30.

In the gear transmission device 2, as illustrated in FIGS. 11 to 14, the second guide surface 262 of the second guide portion 260 is curved to extend toward the sun gear 10 as the second guide surface 262 extends substantially in the separating direction LD1. The first guide surface 261 of the second guide portion 260 is curved to extend toward the second guide surface 262 as the first guide surface 261 extends substantially in the separating direction LD1. Such a configuration may thus enable the first guide surface 261 and the second guide surface 262 to properly hold the third shaft 243 of the auxiliary gear 240 therebetween until the planet gear 30 reaches the engaged position after the auxiliary gear 240 comes into mesh with the planet gear 30, thereby increasing the friction force acting on the third shaft 243. Increasing the friction force may further enable maintaining of the proper meshing depth of the auxiliary gear 240 with the planet gear 30, thereby enabling the auxiliary gear 240 to move more smoothly and also the planet gear 30 to move more smoothly in the opposite direction to the moving direction of the auxiliary gear 240.

In the gear transmission device 2, as illustrated in FIG. 10, the outside diameter D243 of the third shaft 243 is greater than the outside diameter D32 of the second shaft 32. The first guide surface 261, the second guide surface 262, and the stopper surface 263 may have a relatively large size corresponding to the outside diameter D243 of the third shaft 243. Thus, the first guide surface 261, the second guide surface 262, and the stopper surface 263 may be formed with precision. Consequently, even if the distance that the second guide portion 260 guides the third shaft 243 is infinitesimal, the first guide surface 261, the second guide surface 262, and the stopper surface 263 may exert their effect on the third shaft 243 accurately. The planet gear 30 may thus move between the engaged position and the disengaged position more smoothly.

In the gear transmission device 2, as illustrated in FIG. 10, the outside diameter D240 of the auxiliary gear 240 is less than the outside diameter D30 of the planet gear 30. Thus, the number of rotations of the auxiliary gear 240 per unit time is greater than the number of rotations of the planet gear 30 per unit time. Such a configuration may thus enable the sliding speed of the third shaft 243 to be increased when the third shaft 243 of the auxiliary gear 240 contacts the first guide surface 261 and the second guide surface 262 of the second guide portion 260 and the stopper surface 263 while rotating. Consequently, reactivity of the auxiliary gear 240 may be increased, thereby enabling the planet gear 30 to move more smoothly between the engaged position and the disengaged position.

In the gear transmission device 2, as illustrated in FIGS. 10 and 11, the first frame 91 and the second frame 92 include the second guide portions 260, respectively. The second guide portions 260 are configured to, when the third shaft 243 of the auxiliary gear 240 moves backward and forward in the second guide portions 260, guide the third shaft 243. Such a configuration may restrict inclination of the auxiliary gear 240 relative to the first axis direction. Consequently, the planet gear 30 may move more smoothly between the engaged position and the disengaged position more smoothly.

Alternative Examples of Second Illustrative Embodiment

In one alternative example, in the gear transmission device 2, one of the first frame 91 and the second frame 92 may include the second guide portion 260 and the other of the first frame 91 and the second frame 92 may have a guide groove as an alternative to the second guide portion 260. The guide groove might not penetrate the other of the first frame 91 and the second frame 92. The guide groove may extend along a moving path of the third shaft 243 of the auxiliary gear 240 to be guided by the second guide portion 260. The guide groove may allow one end portion of the third shaft 243 opposite to the other end portion engaged with the second guide portion 260 to be engaged therein, thereby reducing ratting of the one end portion of the third shaft 243.

Figure 15:
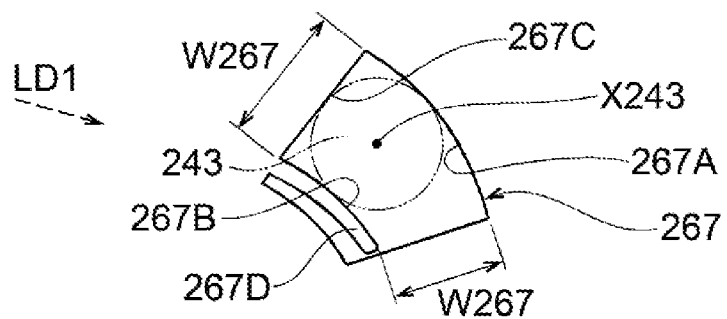
FIG. 15 is a schematic partial front view of another example second guide portion according to the second illustrative embodiment of the disclosure.

In another alternative example, as illustrated in FIG. 15, the first frame 91 and the second frame 92 may include second guide portions 267 (only one of the second guide portions 267 is illustrated in FIG. 15), respectively, as alternatives to the second guide portions 260. Both of the second guide portions 267 may have the same configuration and function, and hereinafter, the description is thus provided with respect to one of the second guide portions 267.

In this alternative example, the second guide portion 267 may have a stopper surface 267C that may have the same configuration as the stopper surface 263 according to the example of the second illustrative embodiment. The stopper surface 267C may have one end and the other end. The one end of the stopper surface 267C may be farther from the planet gear 30 than the other end of the stopper surface 267C may be from the planet gear 30. The second guide portion 267 may have a first guide surface 267A. The first guide surface 267A may extend from the one end of the stopper surface 267C. The second guide surface 267A may be curved to extend toward the sun gear 10 as the first guide surface 267A extends substantially in the separating direction LD1.

The second guide portion 267 may include a flexible portion 267D. The flexible portion 267D is connected to the other end of the stopper surface 267C. The flexible portion 267D may be cantilevered from the other end of the stopper surface 267C and extend in a direction away from the stopper surface 267C along the first guide surface 267A.

The flexible portion 267D may have a second guide surface 267B at its surface facing the first guide surface 267A. The flexible portion 267D may be elastically deformable to enable the second guide surface 267B to move in a direction away from the first guide surface 267A. The second guide surface 267B may be curved to extend toward the first guide surface 267A as the second guide surface 267B extends substantially in the separating direction LD1. The first guide surface 267A and the second guide surface 267B may face each other and may be spaced from each other by a gap W267. The gap W267 may be set to decrease as the second guide portion 260 extends in a direction away from the stopper surface 267C. The first guide surface 267A and the second guide surface 267B is another example of the guide surface of the second guide portion.

According to the alternative examples of the second illustrative embodiment, the same effects as those achieved by the example of the second illustrative embodiment may be achieved.

Third Illustrative Embodiment

As illustrated in FIGS. 16 to 22, the gear transmission device 3 includes a planet gear 330 and an auxiliary gear 340 as alternatives to the planet gear 30 and the auxiliary gear 40, respectively, of the gear transmission device 1. The gear transmission device 3 includes first guide portions 350 and second guide portions 360 as alternatives to the first guide portions 50 and the second guide portion 60, respectively, of the gear transmission device 1. The gear transmission device 3 further includes a coupling member 370. In FIGS. 18, 19, 21, and 22, for simplicity's sake, the coupling member 370 is not illustrated.

The gear transmission device 3 is located between a drive source M1 and a first transmission unit G1 in the second drive force transmission route in an image forming apparatus 9 according to the first illustrative embodiment. The gear transmission device 3 is adopted as an alternative to the rotating direction control mechanism G3 (refer to FIG. 3) but not as an alternative to the gear transmission device 1 of the first illustrative embodiment.

Figure 16:
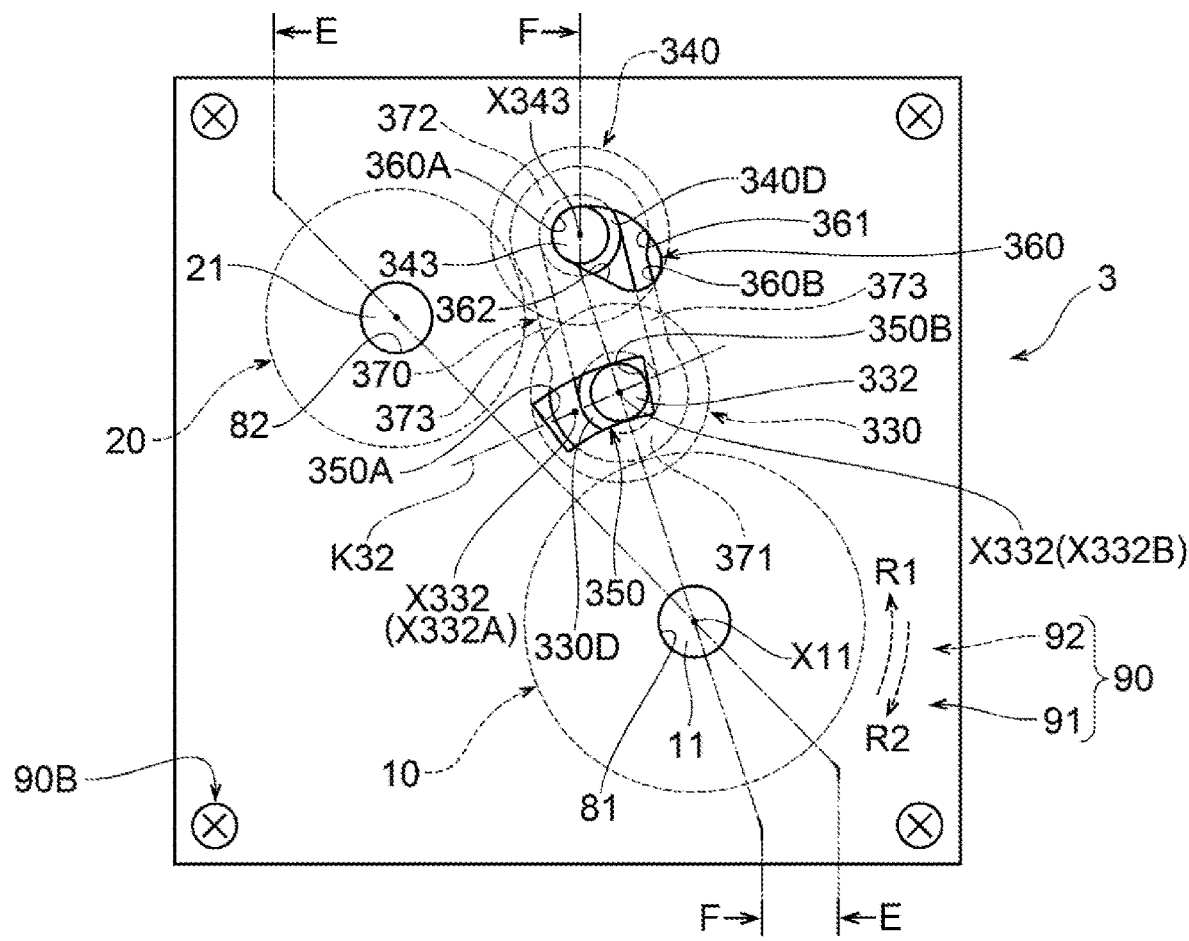
FIG. 16 is a plan view of a gear transmission device according to a third illustrative embodiment of the disclosure.

The relative positional relationship between the sun gear 10 and the driven gear 20 and the outside diameters of the sun gear 10 and the driven gear 20 according to the third illustrative embodiment are slightly different from those according to the first illustrative embodiment. The E-E section of the gear transmission device 3 in FIG. 16 is a cross section cut in the same way as the A-A section of the gear transmission device 1 in FIG. 2. Thus, the E-E section of the gear transmission device 3 is substantially the same as the A-A section of the gear transmission device 1 and FIG. 3 also illustrates the E-E section of the gear transmission device 3 in FIG. 16. The gear transmission device 3 also includes a sun gear 10 including a first shaft 11 and a driven gear 20 including a rotating shaft 21. The first shaft 11 of the sun gear 10 of the gear transmission device 3 is connected to the drive source M1 in parallel with the first shaft 11 of the sun gear 10 of the gear transmission device 1. The rotating shaft 21 of the driven gear 20 of the gear transmission device 3 is connected to the first transmission unit G1. As illustrated in FIG. 16, in the gear transmission device 3, the sun gear 10 is configured to, in response to the drive source M1 rotating selectively in one of a forward direction and a reverse direction, rotate correspondingly in one of a first direction R1 and a second direction R2.

The other configuration adopted in the third illustrative embodiment is the same or similar to the configuration adopted in the first illustrative embodiment. In the third illustrative embodiment, common components or elements have the same reference numerals as those of the first illustrative embodiment, and the detailed description of the common components or elements is omitted.

Figure 18:
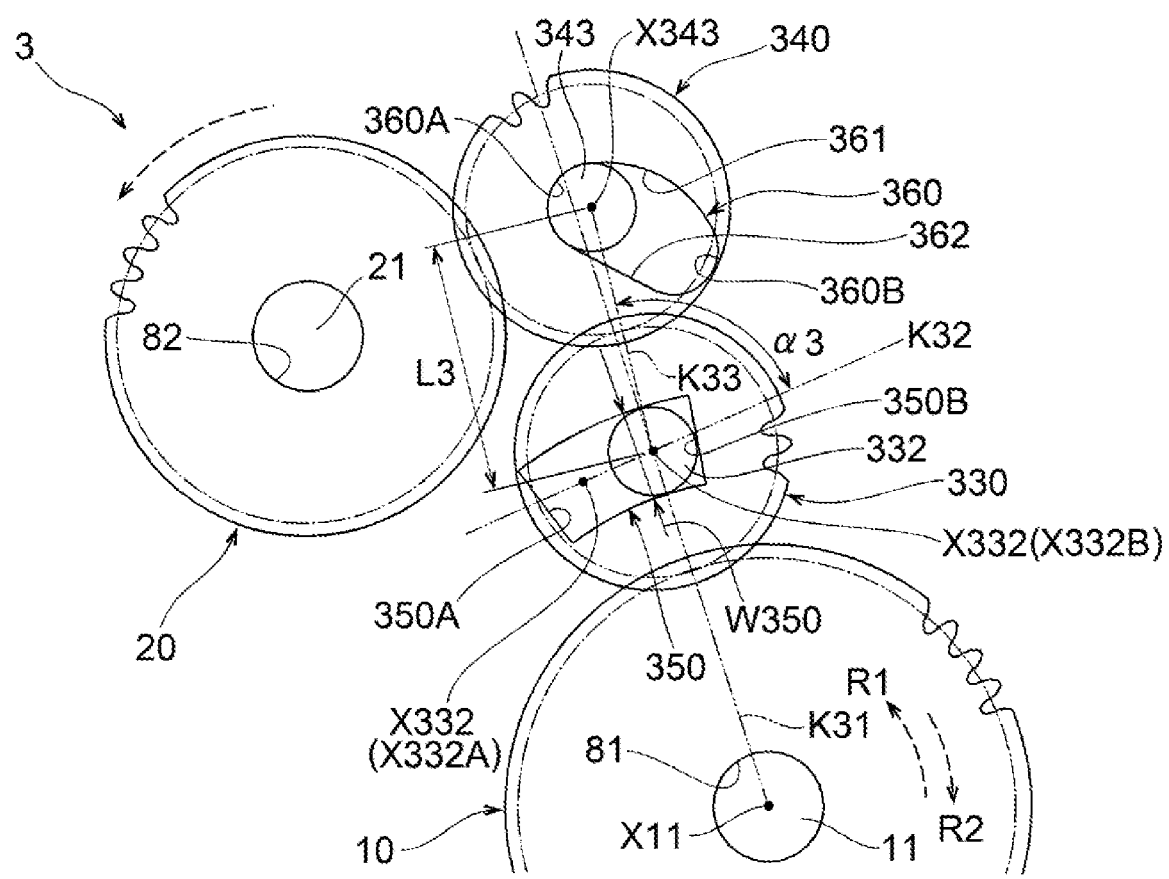
FIG. 18 is a schematic partial front view illustrating a relative positional relationship between a sun gear, a driven gear, a planet gear at a disengaged position, an auxiliary gear, a first guide portion, and a second guide portion according to the third illustrative embodiment of the disclosure.

As simply illustrated in FIG. 18, the planet gear 330 and the auxiliary gear 340 may also be spur gears similar to the sun gear 10 and the driven gear 20.

Figure 17:
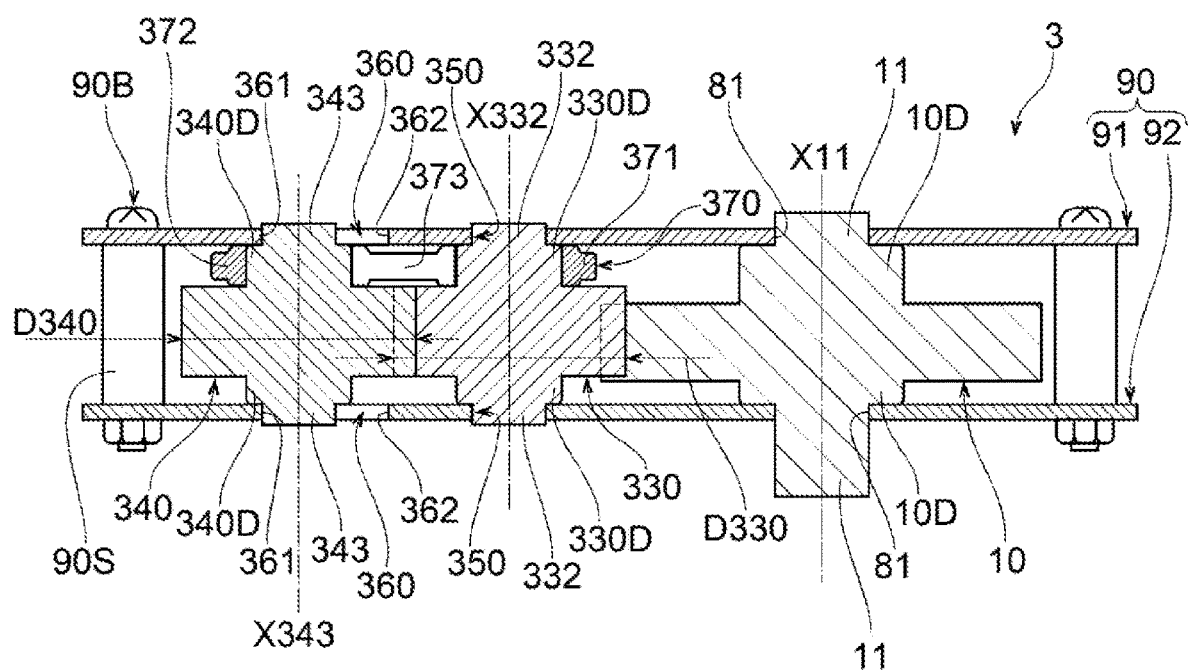
FIG. 17 is a sectional view of the gear transmission device taken along line F-F of FIG. 16 according to the third illustrative embodiment of the disclosure.

As illustrated in FIG. 17, the planet gear 330 has a one-piece structure including a second shaft 332. The second shaft 332 may be a cylindrical shaft that extends parallel to the first shaft 11. The second shaft 332 has a second axis X332 as its center. The second shaft 332 protrudes from each side of the planet gear 330 toward a first frame 91 or toward a second frame 92. The planet gear 330 includes stepped portions 330D around the second shaft 332 and on the side facing the first frame 91 and the side facing the second frame 92, respectively.

The auxiliary gear 340 has a one-piece structure including a third shaft 343. The third shaft 343 may be a cylindrical shaft that extends parallel to the first shaft 11. The third shaft 343 has a third axis X343 as its center. The third shaft 343 protrudes from each side of the auxiliary gear 340 toward the first frame 91 or toward the second frame 92. The auxiliary gear 340 includes stepped portions 340D around the third shaft 343 and on the side facing the first frame 91 and the side facing the second frame 92, respectively.

The planet gear 330 has an outside diameter D330, and the auxiliary gear 340 has an outside diameter D340. The outside diameter D330 of the planet gear 330 is equal to the outside diameter D340 of the auxiliary gear 340. The second shaft 332 of the planet gear 330 and the third shaft 343 of the auxiliary gear 340 have equal diameters. The stepped portion 330D of the planet gear 330 and the stepped portion 340D of the auxiliary gear 340 have equal diameters.

That is, in the third illustrative embodiment, the planet gear 330 and the auxiliary gear 340 have the identical shape. In other words, the planet gear 330 and the auxiliary gear 340 are common parts, thereby enabling reduction of a parts count of the image forming apparatus 9.

As illustrated in FIGS. 16 to 19, the first frame 91 and the second frame 92 include the first guide portions 350, respectively. The first guide portions 350 may be grooves that penetrate the first frame 91 and the second frame 92, respectively. The first guide portions 350 are engaged with the second shaft 332 of the planet gear 330 by insertion.

Both of the first guide portions 350 may have the same configuration and function, and hereinafter, the description is thus provided with respect to one of the first guide portions 50. As illustrated in FIG. 18, the first guide portion 350 has an arc shape and may be a segment of a circle having the first axis X11 as its center. The first guide portion 350 has an inner width W350 in a radial direction of the first shaft 11. The inner width W350 is slightly greater than an outside diameter of the second shaft 332.

The first guide portion 350 has a first end 350A and a second end 350B in a circumferential direction of the first shaft 11. The first end 350A is closer to the driven gear 20 than the second end 350B is to the driven gear 20. The first end 350A and the second end 350B each have a flat surface that forms a straight line as viewed in the first axis direction.

As illustrated in FIGS. 18 to 22, the first guide portion 350 is configured to, when the second shaft 332 moves in the first guide portion 350, guide the second shaft 332 to move about the first axis X11 with the planet gear 330 in constant mesh with the sun gear 10. That is, the planet gear 330 is supported by the frame 90 such that the planet gear 330 is rotatable about the second axis X332 of the second shaft 332 and is movable about the first axis X11 of the sun gear 10.

As illustrated in FIG. 17, the planet gear 330 is disposed such that the stepped portions 330D face the first frame 91 and the second frame 92, respectively, with a slight gap left therebetween. Such an arrangement may thus reduce rattling of the planet gear 330 in the first axis direction.

As illustrated in FIG. 18, when the second shaft 332 of the planet gear 330 is located at a particular position where the second shaft 332 is in contact with the second end 350B of the first guide portion 350 and the second end 350B restricts a further movement of the second shaft 332 toward the second end 350B, the planet gear 330 is spaced farthest from the driven gear 20. The position of the planet gear 330 of FIGS. 16, 18, and 20 may be referred to as a disengaged position.

Figure 19:
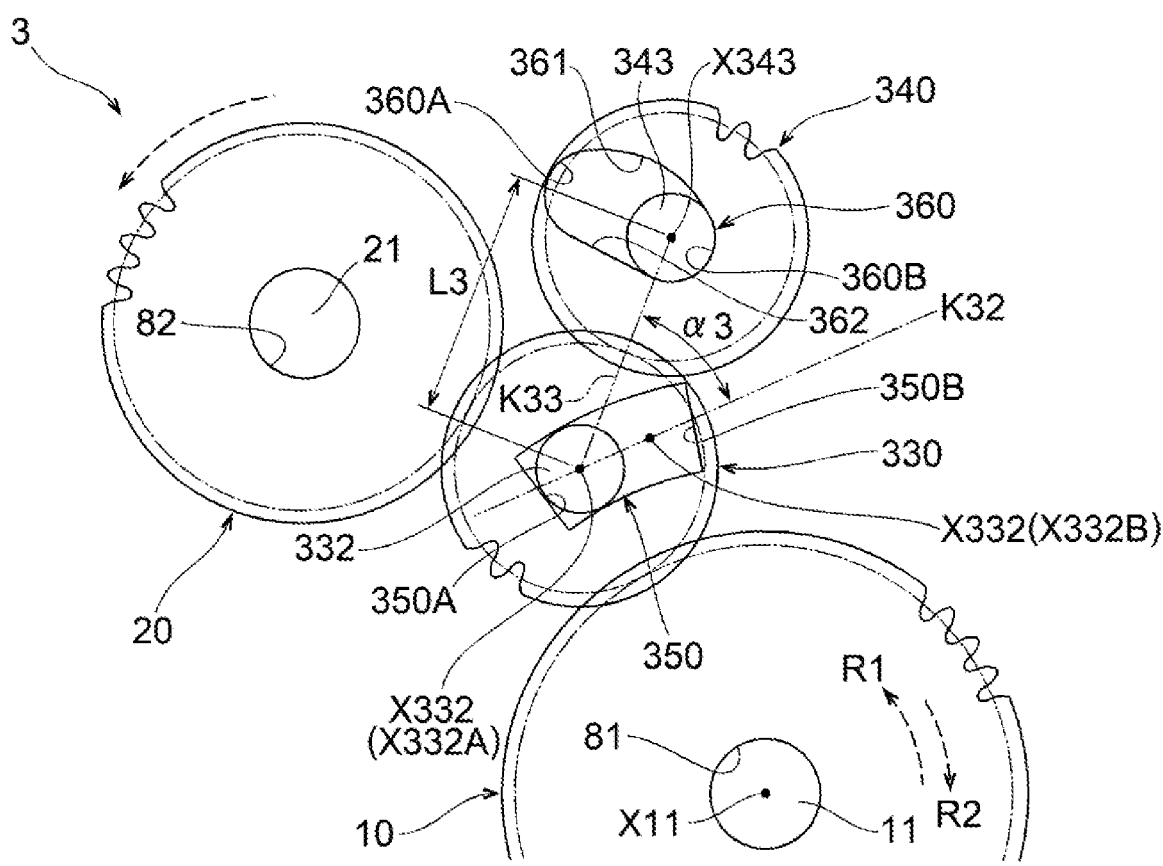
FIG. 19 is a schematic partial front view illustrating the relative positional relationship between the sun gear, the driven gear, the planet gear at an engaged position, the auxiliary gear, the first guide portion, and the second guide portion according to the third illustrative embodiment of the disclosure.

As illustrated in FIG. 19, when the second shaft 332 of the planet gear 330 is located at another particular position where the second shaft 332 is in contact with the first end 350A of the first guide portion 350 and the first end 350A restricts a further movement of the second shaft 332 toward the first end 350A, the planet gear 330 is in mesh with the driven gear 20 with interlocking teeth by a proper meshing depth. This particular position (refer to FIG. 19) of the planet gear 330 may be referred to as an engaged position.

Figure 21:
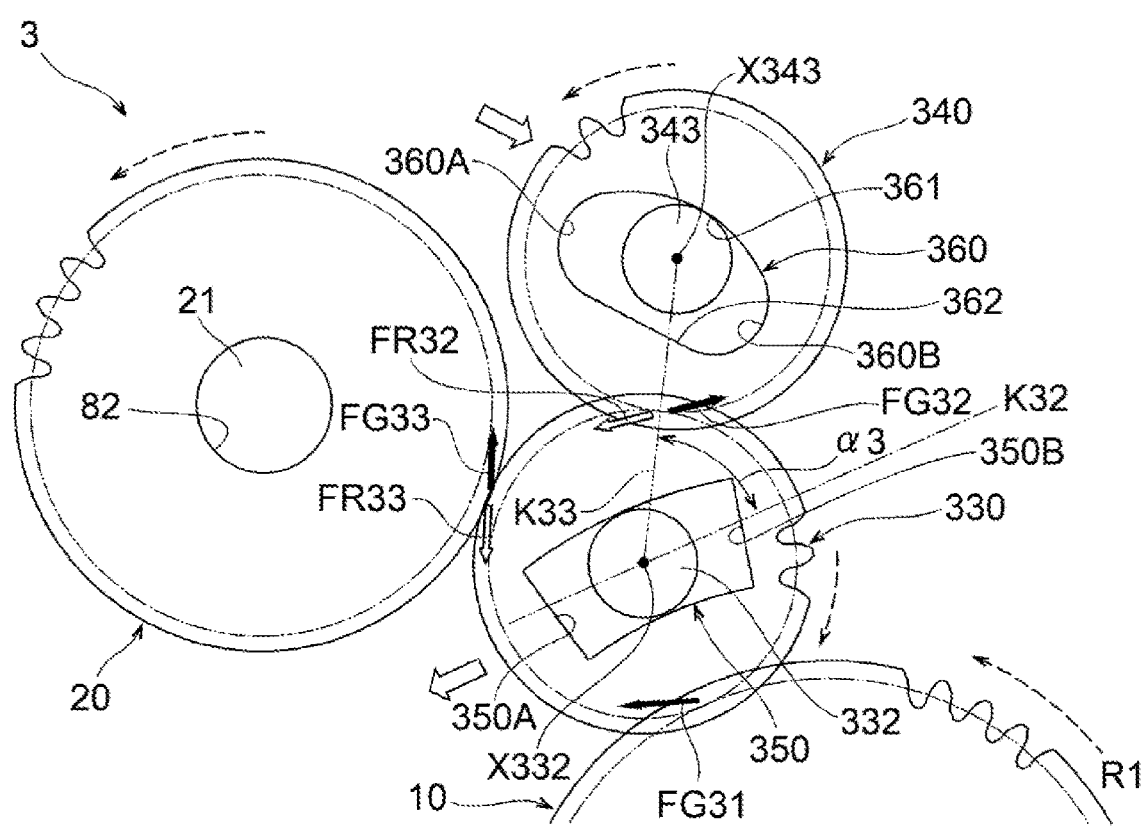
FIG. 21 is a schematic partial front view illustrating the relative positional relationship between the sun gear, the driven gear, the planet gear, the auxiliary gear, the first guide portion, and the second guide portion before establishment of the relationship of FIG. 19 and after establishment of the relationship of FIG. 18 according to the second illustrative embodiment of the disclosure.

As illustrated in FIG. 21, as the second shaft 332 moves from the second end 350B toward the first end 350A in the first guide portion 350, the planet gear 330 comes into mesh with the driven gear 20 and the meshing depth of the planet gear 330 and the driven gear 20 becomes deeper gradually.

Figure 22:
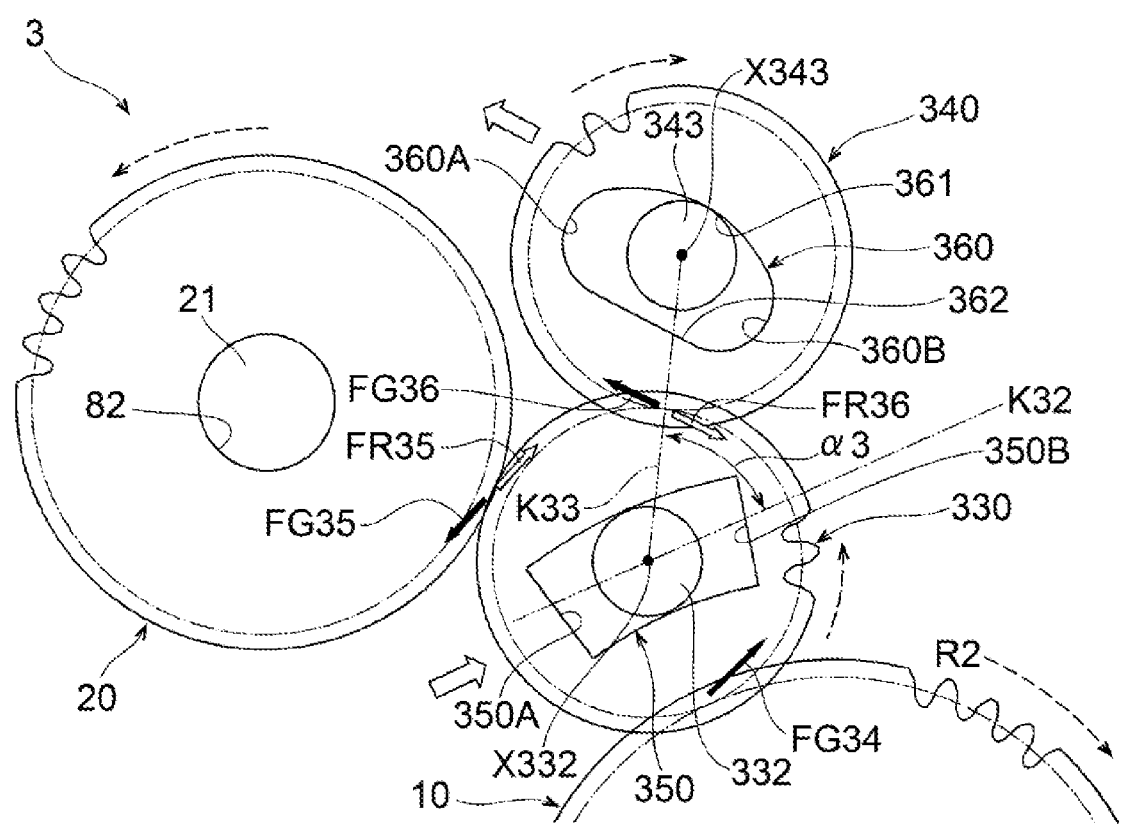
FIG. 22 is a schematic partial front view illustrating the relative positional relationship between the sun gear, the driven gear, the planet gear, the auxiliary gear, the first guide portion, and the second guide portion before establishment of the relationship of FIG. 18 and after establishment of the relationship of FIG. 19 according to the second illustrative embodiment of the disclosure.

As illustrated in FIG. 22, as the second shaft 332 moves from the first end 350A toward the second end 350B in the first guide portion 350, the meshing depth of the planet gear 330 and the driven gear 20 becomes shallower gradually and thus the planet gear 330 disengages from the driven gear 20.

As illustrated in FIG. 18, a first imaginary line K31 is defined as viewed in the first axis direction. The first imaginary line K31 passes the first axis X11 of the first shaft 11 and the second axis X332 (X332B) of the second shaft 332 of the planet gear 330 located at the disengaged position.

As illustrated in FIG. 18, a second imaginary line K32 is defined as viewed in the first axis direction. The second imaginary line K32 passes the second axis X332 (X332A) of the second shaft 332 of the planet gear 330 located at the engaged position and the second axis X332 (X332B) of the second shaft 332 of the planet gear 330 located at the disengaged position. The second imaginary line K32 extends along a direction in which the planet gear 330 moves backward and forward (hereinafter, simply referred to as the "moving direction of the planet gear 330").

As illustrated in FIGS. 16 to 19, the first frame 91 and the second frame 92 further include second guide portions 360, respectively. Like the first guide portions 350, the second guide portions 360 may be grooves that penetrate the first frame 91 and the second frame 92, respectively. The second guide portions 360 are engaged with the third shaft 343 of the auxiliary gear 340 by insertion.

Both of the second guide portions 360 may have the same configuration and function, and hereinafter, the description is thus provided with respect to one of the second guide portions 360. As illustrated in FIG. 18, as viewed in the first axis direction, the second guide portion 360 is positioned opposite to the driven gear 20 relative to the first imaginary line K31 and opposite to the sun gear 10 relative to the second imaginary line K32.

The second guide portion 360 has a first end 360A and a second end 360B in its longitudinal direction. The first end 360A is positioned closer to the first imaginary line K31 than the second end 360B is to the first imaginary line K31, and farther from the second imaginary line K32 than the second end 360B is from the second imaginary line K32. The first imaginary line K31 passes across the first end 360A. The first end 360A and the second end 360B each have a curved surface that forms a substantially semicircular arc shape as viewed in the first axis direction.

The second guide portion 360 has a first guide surface 361 and a second guide surface 362. The first guide surface 361 and the second guide surface 362 are another example of the guide surface of the second guide portion.

The first end 360A of the second guide portion 360 has one end and the other end. The one end of the first end 360A is farther from the planet gear 330 than the other end of the first end 360A is from the planet gear 330. The second end 360B of the second guide portion 360 has one end and the other end. The one end of the second end 360B is farther from the planet gear 330 than the other end of the second end 360B is from the planet gear 330. In the second guide portion 360, the first guide surface 361 extends from the one end of the first end 360A to the one end of the second end 360B. The first guide surface 361 is curved such that, as viewed in the first axis direction, its middle portion is farther from the second guide surface 362 than its end portions are from the second guide surface 362. The first guide surface 361 is positioned farther from the planet gear 330 than the second guide surface 362 is from the planet gear 330 in a radial direction of the planet gear 330, and is contactable with the third shaft 343.

In the second guide portion 360, the second guide surface 362 substantially straightly extends from the other end of the first end 360A to the other end of the second end 360B. The second guide surface 362 is positioned closer to the planet gear 330 than the first guide surface 361 is to the planet gear 330 in the radial direction of the planet gear 330, and is contactable with the third shaft 343. When the third shaft 343 is located near or in contact with either of the first end 360A and the second end 360B, the second guide surface 362 contacts the third shaft 343.

As illustrated in FIGS. 18 to 22, the first guide surface 361 and the second guide surface 362 of the second guide portion 360 are configured to, when the third shaft 343 moves in the second guide portion 360 with the auxiliary gear 340 in constant mesh with the planet gear 330, guide the third shaft 343 such that the third shaft 343 moves between a first particular position and a second particular position. The first particular position may refer to a position where the third shaft 343 is in contact with the first end 360A of the second guide portion 360 and the first end 360A restricts a further movement of the third shaft 343 toward the first end 360A. The second particular position may refer to a position where the third shaft 343 is in contact with the second end 360B of the second guide portion 360 and the second end 360B restricts a further movement of the third shaft 343 toward the second end 360B. That is, the auxiliary gear 340 is supported by the frame 90 such that the auxiliary gear 340 rotates about the third axis X343 and moves along the second guide portion 360 in the longitudinal direction.

As illustrated in FIG. 17, the auxiliary gear 340 is disposed such that the stepped portions 340D face the first frame 91 and the second frame 92, respectively, with a slight gap left therebetween. Such an arrangement may thus reduce rattling of the auxiliary gear 340 in the first axis direction.

As illustrated in FIG. 18, when the third shaft 343 of the auxiliary gear 340 is located at a particular position where the third shaft 343 is in contact with the first end 360A of the second guide portion 360 and the first end 360A restricts a further movement of the third shaft 343 toward the first end 360A, the auxiliary gear 340 is located nearest to the driven gear 20 and is in mesh with the driven gear 20. At this position, the auxiliary gear 340 is in mesh with the planet gear 330 located at the disengaged position. That is, the second guide portion 360 is configured to guide the third shaft 343 such that the auxiliary gear 340 comes into mesh with the driven gear 20 as the planet gear 330 reaches the disengaged position by its movement.

As illustrated in FIG. 19, when the third shaft 343 of the auxiliary gear 340 is located at a particular position where the third shaft 343 is in contact with the second end 360B of the second guide portion 360 and the second end 360B restricts a further movement of the third shaft 343 toward the second end 360B, the auxiliary gear 340 is spaced farthest from the driven gear 20. At this position, the auxiliary gear 340 is in mesh with the planet gear 330 located at the engaged position.

As illustrated in FIGS. 21 and 22, as the third shaft 343 of the auxiliary gear 340 moves between the first end 360A and the second end 360B of the second guide portion 360 while contacting the first guide surface 361, the second shaft 332 of the planet gear 330 in constant mesh with the auxiliary gear 340 moves correspondingly in a direction opposite to the direction in which the third shaft 343 of the auxiliary gear 340 moves.

As illustrated in FIG. 18, as viewed in the first axis direction, the third axis X343 of the third shaft 343 is positioned opposite to the driven gear 20 relative to the first imaginary line K31.

As illustrated in FIGS. 18 and 19, an imaginary line segment K33 is defined as viewed in the first axis direction. The imaginary line segment K33 connects between the second axis X332 of the second shaft 332 and the third axis X343 of the third shaft 343. An interior angle formed by the second imaginary line K32 and the imaginary line segment K33 is defined as an interior angle α3. The imaginary line segment K33 has a length L3.

The interior angle α3 is set to decrease as the planet gear 330 moves from the disengaged position (refer to FIG. 18) toward the engaged position (refer to FIG. 19). The first guide surface 361 of the second guide portion 360 is curved such that, while the planet gear 330 moves between the engaged position (refer to FIG. 19) and the disengaged position (refer to FIG. 18), the first guide surface 361 guides the third shaft 343 with the length L3 of the imaginary line segment K33 remaining constant.

Figure 20:
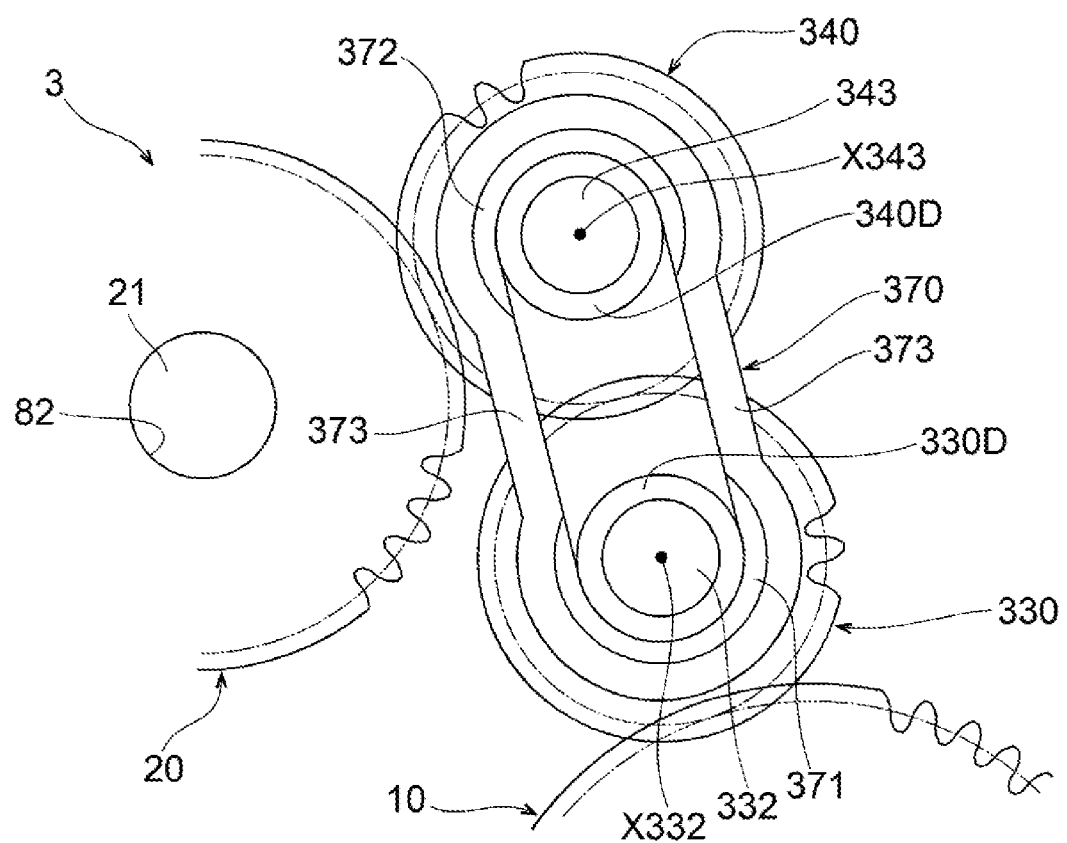
FIG. 20 is a schematic partial front view illustrating a coupling member that connects between the planet gear and the auxiliary gear, and its surrounding members according to the third illustrative embodiment of the disclosure.

The coupling member 370 may be a resin molded part. In this example, as illustrated in FIGS. 17 and 20, the coupling member 370 may have an oval annular shape. The coupling member 370 is disposed between the first frame 91, and the planet gear 330 and the auxiliary gear 340, both of which face the first frame 91 in the first axis direction. The coupling member 370 includes a first slide-contact portion 371, a second slide-contact portion 372, and a connecting portion 373.

Each of the first slide-contact portion 371 and the second slide-contact portion 372 may have a semicircular shape. The first slide-contact portion 371 and the second slide-contact portion 372 are spaced from each other. The connecting portion 373 includes straight portions. One of the straight portions connects between one end of the first slide-contact portion 371 and one end of the second slide-contact portion 372. The other of the straight portions connects between the other end of the first slide-contact portion 371 and the other end of the second slide-contact portion 372.

The first slide-contact portion 371 is positioned opposite to the third shaft 343 relative to the second shaft 332 and in contact with one of the stepped portions 330D of the planet gear 330 in a radial direction of the second shaft 332. The stepped portion 330D contacting the first slide-contact portion 371 is disposed on the side of the planet gear 330 facing the first frame 91. The first slide-contact portion 371 may slide relative to the stepped portion 330D when the planet gear 330 rotates.

The second slide-contact portion 372 is positioned opposite to the second shaft 332 relative to the third shaft 343 and in contact with one of the stepped portions 340D of the auxiliary gear 340 in a radial direction of the third shaft 343. The stepped portion 340D contacting the second slide-contact portion 372 is disposed on the side of the auxiliary gear 340 facing the first frame 91. The second slide-contact portion 372 may slide relative to the stepped portion 340D when the auxiliary gear 340 rotates.

The connecting portion 373 connects between the first slide-contact portion 371 and the second slide-contact portion 372 to keep a distance between the first slide-contact portion 371 and the second slide-contact portion 372 constant. Maintaining the constant distance between the first slide-contact portion 371 and the second slide-contact portion 372 may refer to maintaining a distance between the second axis X332 of the second shaft 332 and the third axis X343 of the third shaft 343, that is, the length L3 of the imaginary line segment K33 at a particular length or less.

In the third illustrative embodiment, the second guide portion 360 and the coupling member 370 function to maintain the length L3 of the imaginary line segment K33 at the particular length or less. The particular length may be equal to a sum of a radius of a pitch circle of the planet gear 330 and a radius of a pitch circle of the auxiliary gear 340. Such a configuration may thus restrict changing (e.g., becoming shallower) in the meshing depth of the planet gear 330 and the auxiliary gear 340.

Actions and Effects

In the gear transmission device 3 according to the third illustrative embodiment, due to effect of the planet gear 330, the auxiliary gear 340, the first guide portion 350, the second guide portion 360, and coupling member 370, the planet gear 330 moves between the engaged position (refer to FIG. 19) and the disengaged position (refer to FIG. 18) and the auxiliary gear 340 moves between the farthest position (refer to FIG. 19) and the engaged position (refer to FIG. 18) correspondingly.

For color printing, as the sun gear 10 rotates in the first direction R1 in response to the drive source M1 rotating in the forward direction, the planet gear 330 moves from the disengaged position (refer to FIG. 18) toward the engaged position. When the planet gear 330 reaches a particular position (refer to FIG. 21), the planet gear 330 receives a pressing force FG31 from the sun gear 10 via interlocking teeth to move toward the engaged position. In response to the sun gear 10 rotating in the first direction R1, the planet gear 330 rotates in the clockwise direction in FIG. 21.

In response to the planet gear 330 rotating in the clockwise direction, the auxiliary gear 340 always meshing with the planet gear 330 rotates in a direction opposite to the rotating direction of the planet gear 330. The coupling member 370 attempts to pull the auxiliary gear 340 toward the planet gear 330. By such an action, the auxiliary gear 340 is repelled from the driven gear 20 and comes separated from the driven gear 20. Thus, the auxiliary gear 340 starts moving in the direction away from the driven gear 20.

Then, a pressing force FG32 acts on the auxiliary gear 340 from the planet gear 330 via interlocking teeth. Due to the effect of the pressing force FG32, the third shaft 343 of the auxiliary gear 340 is pressed against the first guide surface 361 of the second guide portion 360 while rotating, and thus the auxiliary gear 340 moves in the direction away from the driven gear 20.

At the same time, a pressing force that attempts to separate the second shaft 332 of the planet gear 330 and the third shaft 343 of the auxiliary gear 340 from each other generates due to an operating pressure angle of the planet gear 330 and the auxiliary gear 340. Such a pressing force thus acts on contacting surfaces of the third shaft 343 and the first guide surface 361 of the second guide portion 360. Due to the effect of such a pressing force, a repulsive force FR32 acting in a direction to press the planet gear 330 toward the engaged position acts on the planet gear 330 from the auxiliary gear 340 via interlocking teeth. The effect of the coupling member 370 attempting to pull the auxiliary gear 340 toward the planet gear 330 may enable the friction force to appropriately act on contacting surfaces of the first guide portion 350 and the second shaft 332 of the planet gear 330.

Although a repulsive force FR33 for a pressing force FG33 that the driven gear 20 receives from the planet gear 330 acts on the planet gear 330, the repulsive force FR33 includes a component of force acting in the moving direction of the planet gear 330.

Thus, under the action of the repulsive force FR32 and the pressing force FG31, the second shaft 332 moves in the opposite direction to the direction in which the third shaft 343 moves while the second shaft 332 is guided by the first guide portion 350. Such an action may thus enable the planet gear 330 to move to the engaged position (refer to FIG. 19) smoothly. Further, under the action of the pressing force FG32, the auxiliary gear 340 is pulled toward the planet gear 330 by the coupling member 370 while the third shaft 343 is guided by the second guide portion 360. Such an action may thus the auxiliary gear 340 to move to the farthest position smoothly. At that time, a friction force generated due to the pressing force acting on contacting surfaces of the third shaft 343 and the first guide surface 361 of the second guide portion 360 contributes to the movement of the auxiliary gear 340 in the direction in which the auxiliary gear 340 moves by its rotation. Consequently, the rotation of the sun gear 10 is transmitted to the driven gear 20 via the planet gear 330 and the driven gear 20 rotates in the particular direction, that is, in the first direction R1.

As illustrated in FIGS. 18 and 19, as viewed in the first axis direction, the interior angle α3 formed by the second imaginary line K32 and the imaginary line segment K33 is set to decrease as the planet gear 330 moves from the disengaged position toward the engaged position. That is, the auxiliary gear 340 moves to the opposite side to the driven gear 20 relative to the planet gear 330 moving toward the engaged position. Such a movement may thus enable the auxiliary gear 340 to effectively exert, on the planet gear 330 via interlocking teeth, the repulsive force FR32 acting in the direction to press the planet gear 330 toward the engaged position. Consequently, the planet gear 330 may move to the engaged position more smoothly.

As illustrated in FIG. 19, after the planet gear 330 and the auxiliary gear 340 reach the engaged position and the farthest position, respectively, the sun gear 10 continues rotating in the first direction R1. Thus, the gear transmission device 3 allows transmission of the drive force from the drive source M1 to the first transmission unit G1 via the driven gear 20. At the same time, the drive force of the drive source M1 is also transmitted to the second transmission unit G2 via the gear transmission device 1 according to the first illustrative embodiment. Thus, all of the developing rollers 5E rotate to perform color printing.

For monochrome printing, as the sun gear 10 rotates in the second direction R2 in response to the drive source M1 rotating in the reverse direction, the planet gear 330 moves from the engaged position (refer to FIG. 19) toward the disengaged position. When the planet gear 330 reaches a particular position (refer to FIG. 22), the planet gear 330 receives a pressing force FG34 from the sun gear 10 via interlocking teeth. When the planet gear 330 attempts to rotate in the counterclockwise direction in FIG. 22, a load of the first transmission unit G1 is applied to the driven gear 20 meshing with the planet gear 330, thereby causing the driven gear 20 hard to rotate. Thus, a repulsive force FR35 for a pressing force FG35 that the driven gear 20 receives from the planet gear 330 acts on the planet gear 330 via interlocking teeth. The repulsive force FR35 and the pressing force FG34 cause the planet gear 330 to be repelled from the driven gear 20. The planet gear 330 thus moves toward the disengaged position.

In response to the planet gear 330 rotating in the counterclockwise direction, the auxiliary gear 340 always meshing with the planet gear 330 rotates in a direction opposite to the rotating direction of the planet gear 330. Then, a pressing force FG36 acts on the auxiliary gear 340 from the planet gear 330 via interlocking teeth. Due to the effect of the pressing force FG36, the third shaft 343 of the auxiliary gear 340 is pressed against the first guide surface 361 of the second guide portion 360 while rotating, and thus the auxiliary gear 340 moves in a direction in which the auxiliary gear 340 approaches the driven gear 20.

At the same time, a pressing force that attempts to separate the second shaft 332 of the planet gear 330 and the third shaft 343 of the auxiliary gear 340 from each other generates due to an operating pressure angle of the planet gear 330 and the auxiliary gear 340. Such a pressing force thus acts on contacting surfaces of the third shaft 343 and the first guide surface 361 of the second guide portion 360. Due to the effect of such a pressing force, a repulsive force FR36 acting in a direction to press the planet gear 330 toward the disengaged position acts on the planet gear 330 from the auxiliary gear 340 via interlocking teeth. The effect of the coupling member 370 attempting to pull the auxiliary gear 340 toward the planet gear 330 may enable the friction force to appropriately act on contacting surfaces of the first guide portion 350 and the second shaft 332 of the planet gear 330.

Thus, under the action of the repulsive force FR36 and the pressing force FG34, the second shaft 332 moves in the opposite direction to the direction in which the third shaft 343 moves while the second shaft 332 is guided by the first guide portion 350. Such an action may thus enable the planet gear 330 to move to the disengaged position (refer to FIG. 18) smoothly. Further, under the action of the pressing force FG36, the auxiliary gear 340 is pulled toward the planet gear 330 by the coupling member 370 while the third shaft 343 is guided by the second guide portion 360. Such an action may thus the auxiliary gear 340 to move to the engaged position smoothly. At that time, a friction force generated due to the pressing force acting on contacting surfaces of the third shaft 343 and the first guide surface 361 of the second guide portion 360 contributes to the movement of the auxiliary gear 340 in the direction in which the auxiliary gear 340 moves by its rotation. Consequently, the rotation of the sun gear 10 is transmitted to the driven gear 20 via the planet gear 330 and the auxiliary gear 340, and the driven gear 20 rotates in the first direction R1.

That is, the gear transmission device 3 may enable the driven gear 20 to be rotated in the first direction R1 smoothly by rotation of the sun gear 10 regardless of the rotating direction (e.g., the first direction R1 or the second direction R2) of the sun gear 10.

It is assumed that, in the gear transmission device 3, when the auxiliary gear 340 changes the place, the third axis X343 of the third shaft 343 moves via the first imaginary line K31 from a near side to a far side that is opposite to the near side relative to the first imaginary line K31. When the third shaft 343 is located on the near side, the third shaft 343 is located on the same side as the side on which the driven gear 20 is located relative to the first imaginary line K31. When the third shaft 343 is located on the far side, the third shaft 343 is located opposite to the driven gear 20 relative to the first imaginary line K31. In such a case, when the third axis X343 of the third shaft 343 crosses the first imaginary line K31, a load of the auxiliary gear 340 on the planet gear 330 may reach its peak. Nevertheless, in the gear transmission device 3 according to the third illustrative embodiment, as viewed in the first axis direction, the third axis X343 of the third shaft 343 is positioned opposite to the driven gear 20 relative to the first imaginary line K31. Thus, when the auxiliary gear 340 changes the place, the auxiliary gear 340 does not need to pass the position at which the load of the auxiliary gear 340 on the planet gear 330 may reach its peak. Such a configuration may thus enable the auxiliary gear 340 to also move smoothly.

In contrast to the known gear transmission device, the gear transmission device 3 according to the third illustrative embodiment eliminates the need to press the planet gear 30 against the first frame 91 or the second frame 92 at all times by the urging force acting in the direction parallel to the first axis X11. Thus, the friction force to be generated between contacting surfaces of the planet gear 330 and the frame 90 may be reduced significantly.

Consequently, as with the first and second illustrative embodiments, such a configuration may reduce a driving load that may act in the gear transmission device 3 according to the third illustrative embodiment, thereby reducing noise and power consumption in the image forming apparatus 9 including the gear transmission device 3.

As illustrated in FIG. 20, the coupling member 370 used in the gear transmission device 3 may have a simple oval annular shape including the first slide-contact portion 371, the second slide-contact portion 372, and the connecting portion 373. The coupling member 370 may be thus manufactured at a low cost.

In the gear transmission device 3, as illustrated in FIG. 17, the outside diameter D330 of the planet gear 330 is equal in size to the outside diameter D340 of the auxiliary gear 340. Such a configuration may thus the planet gear 330 and the auxiliary gear 340 to have the same number of teeth, thereby further enabling a gear reduction ratio of when the sun gear 10 drives the driven gear 20 via the planet gear 330 to be equal to a gear reduction ratio of when the sun gear 10 drives the driven gear 20 via the planet gear 330 and the auxiliary gear 340. Consequently, the gear transmission device 3 may enable the driven gear 20 to be rotated in the first direction R1 smoothly at a constant speed by constant-speed rotation of the sun gear 10 regardless of the rotating direction (e.g., the first direction R1 or the second direction R2) of the sun gear 10.

In the gear transmission device 3, as illustrated in FIGS. 16 and 17, the first frame 91 and the second frame 92 include the first guide portions 350, respectively. The first guide portions 350 are configured to, when the second shaft 332 of the planet gear 330 moves backward and forward in the first guide portions 350, guide the second shaft 332. The first frame 91 and the second frame 92 further include the second guide portions 360, respectively. The second guide portions 360 are configured to, when the third shaft 343 of the auxiliary gear 340 moves backward and forward in the second guide portions 360, guide the third shaft 343. Such a configuration may thus restrict inclination of the planet gear 330 and the auxiliary gear 340 relative to the first axis direction. Consequently, the planet gear 330 may move more smoothly between the engaged position (refer to FIG. 19) and the disengaged position (refer to FIG. 18). In addition, the auxiliary gear 340 may move more smoothly between the farthest position (refer to FIG. 19) and the engaged position (refer to FIG. 18).

While the disclosure has been described in detail with reference to the specific embodiments thereof, these are merely examples, and various changes, arrangements and modifications may be applied therein without departing from the spirit and scope of the disclosure.

In the first illustrative embodiment, the first guide portion 50 and the second guide portion 60 each penetrate the first frame 91 and the second frame 92. Nevertheless, the configuration of each of the first guide portion 50 and the second guide portion 60 is not limited to the specific example. In other embodiments, for example, a first guide portion and a second guide portion each may have a closed end and might not penetrate the frames 91 and 92. The same modification may be applied to the second or third illustrative embodiment.

In the first illustrative embodiment, as viewed in the first axis direction, the entirety of the third shaft 43 is positioned opposite to the driven gear 20 relative to the first imaginary line K1. Nevertheless, in other embodiments, for example, as viewed in the first axis direction, a portion of the third shaft 43 may be positioned on or overlap the first imaginary line K1. The same modification may be applied to the second or third illustrative embodiment.

In another example of the first illustrative embodiment, another planet gear that may be a double gear including a large-diameter gear and a small-diameter gear may be used as an alternative to the planet gear 30. In such a case, the auxiliary gear 40 may be configured to mesh with the small-diameter gear of the planet gear. Such a configuration may thus enable reduction of the size of the gear transmission device 1. The same modification may be applied to the second embodiment.

In the third illustrative embodiment, the coupling member 370 has an oval annular shape. Nevertheless, the configuration of the coupling member 370 is not limited to the specific example. In one example, a substantially C-shaped coupling member may be used. More specifically, for example, the C-shaped coupling member may have a connecting portion including a single straight portion that may be like one of the straight portions of the connecting portion 373. In another example, a substantially 8-shaped coupling member may be used. More specifically, for example, the 8-shaped coupling member may have a connecting portion including straight portions like the straight portions of the connecting portion 373. The straight portions of the 8-shaped coupling member may be connected to each other at their middle.

In the third illustrative embodiment, the first slide-contact portion 371 slides relative to one of the stepped portions 330D of the planet gear 330. Nevertheless, in other embodiments, for example, the first slide-contact portion 371 may slide relative to the second shaft 332. As with the first slide-contact portion 371, in the third illustrative embodiment, the second slide-contact portion 372 slides relative to one of the stepped portions 340D of the auxiliary gear 340. Nevertheless, in other embodiments, for example, the second slide-contact portion 372 may slide relative to the third shaft 343.

One or more aspects of the disclosure may be adopted to other apparatuses or devices, for example, image forming apparatuses, image reading devices, and multi-function devices.

What is claimed is:

1. A gear transmission device comprising:
a frame;
a sun gear including a first shaft having a first axis, the sun gear being supported by the frame and rotatable about the first axis;
a driven gear rotatably supported by the frame and spaced from the sun gear;
a planet gear disposed in mesh with the sun gear and including a second shaft having a second axis, the planet gear being rotatable about the second axis and movable about the first axis of the sun gear between an engaged position at which the planet gear is in mesh with the driven gear and a disengaged position at which the planet gear is spaced farthest from the driven gear;
an auxiliary gear meshable with the planet gear, the auxiliary gear including a third shaft having a third axis, the auxiliary gear being rotatable about the third axis;

a first guide portion included in the frame and configured to guide the second shaft; and a second guide portion included in the frame and configured to guide the third shaft, the second guide portion having a guide surface, wherein at least a portion of the third shaft of the auxiliary gear is positioned opposite to the driven gear relative to a first imaginary line as viewed in a first axis direction in which the first axis of the sun gear extends, the first imaginary line passing the first axis and the second axis of the planet gear located at the disengaged position, and wherein, as the sun gear rotates with the auxiliary gear in mesh with the planet gear, the third shaft moves in the second guide portion with contacting the guide surface of the second guide portion, and the second shaft moves in a direction opposite to a direction in which the third shaft moves.

2. The gear transmission device according to claim 1, wherein, as viewed in the first axis direction, a second imaginary line passes the second axis of the second shaft of the planet gear located at the engaged position and the second axis of the second shaft of the planet gear located at the disengaged position and an imaginary line segment connects between the second axis of the second shaft and the third axis of the third shaft, and wherein an interior angle formed by the second imaginary line and the imaginary line segment is set to decrease as the planet gear moves from the disengaged position toward the engaged position.

3. The gear transmission device according to claim 2, wherein the second guide portion is configured to guide the third shaft such that, while the planet gear moves between the engaged position and the disengaged position, the auxiliary gear stays meshed with the planet gear.

4. The gear transmission device according to claim 3, wherein the second guide portion is further configured to, while the planet gear moves between the engaged position and the disengaged position, guide the third shaft with a length of the imaginary line segment remaining constant.

5. The gear transmission device according to claim 1, wherein the auxiliary gear has a diameter less than a diameter of the planet gear.

6. The gear transmission device according to claim 2, wherein the guide surface of the second guide portion includes:
a first guide surface contactable with the third shaft; and
a second guide surface facing and spaced from the first guide surface by a particular gap, the second guide surface being closer to the planet gear than the first guide surface being to the planet gear in a radial direction of the planet gear, the second guide surface being contactable with the third shaft, wherein the second guide portion further has a stopper surface located at an upstream end of the second guide portion in a separating direction in which the planet gear moves from the engaged position toward the disengaged position, the stopper surface being contactable with the third shaft, and wherein the particular gap is set to decrease as the second guide portion extends substantially in the separating direction.

7. The gear transmission device according to claim 6, wherein the second guide portion includes a flexible portion, and wherein the flexible portion has one of the first guide surface and the second guide surface, and the flexible portion is elastically deformable to enable the one of the first guide surface and the second guide surface to move in a direction away from the other of the first guide surface and the second guide surface.

8. The gear transmission device according to claim 6, wherein the second guide surface is curved to extend toward the sun gear as the second guide surface extends substantially in the separating direction, and wherein the first guide surface is curved to extend toward the second guide surface as the first guide surface extends substantially in the separating direction.

9. The gear transmission device according to claim 6, wherein the third shaft has a diameter greater than a diameter of the second shaft.

10. The gear transmission device according to claim 3, wherein the second guide portion is configured to guide the third shaft such that, when the planet gear reaches the disengaged position, the auxiliary gear comes into mesh with the driven gear, wherein the gear transmission device further comprises a coupling member connecting between the planet gear and the auxiliary gear, and wherein the second guide portion and the coupling member are configured to maintain a length of the imaginary line segment at a particular length or less.

11. The gear transmission device according to claim 10, wherein the coupling member includes:
a first slide-contact portion positioned opposite to the third shaft relative to the second shaft and in contact with the planet gear in a radial direction of the second shaft;
a second slide-contact portion positioned opposite to the second shaft relative to the third shaft and in contact with the auxiliary gear in a radial direction of the third shaft; and
a connecting portion connecting between the first slide-contact portion and the second slide-contact portion to keep a distance between the first slide-contact portion the and second slide-contact portion constant.

12. The gear transmission device according to claim 11, wherein the planet gear has an outside diameter equal to an outside diameter of the auxiliary gear.

13. The gear transmission device according to claim 1, wherein the frame includes a first frame and a second frame facing each other in the first axis direction, wherein the first shaft of the sun gear and the second shaft of planet gear each extend toward the first frame and the second frame, and wherein the first frame and the second frame each include a respective one of the first guide portion and a respective one of the second guide portion.

14. An image forming apparatus according to claim 1, comprising the gear transmission device according to claim 1.

* * * * *